United States Patent
Pandya

(10) Patent No.: US 7,827,190 B2
(45) Date of Patent: Nov. 2, 2010

(54) COMPLEX SYMBOL EVALUATION FOR PROGRAMMABLE INTELLIGENT SEARCH MEMORY

(76) Inventor: Ashish A. Pandya, 4318 Layatette Dr., El Dorado Hills, CA (US) 95762

( * ) Notice: Subject to any disclaimer, the term of this patent is extended or adjusted under 35 U.S.C. 154(b) by 360 days.

(21) Appl. No.: 11/952,112

(22) Filed: Dec. 6, 2007

(65) Prior Publication Data

US 2008/0140632 A1    Jun. 12, 2008

Related U.S. Application Data

(60) Provisional application No. 60/965,267, filed on Aug. 17, 2007, provisional application No. 60/965,170, filed on Aug. 17, 2007, provisional application No. 60/963,059, filed on Aug. 1, 2007, provisional application No. 60/961,596, filed on Jul. 23, 2007, provisional application No. 60/933,313, filed on Jun. 6, 2007, provisional application No. 60/933,332, filed on Jun. 6, 2007, provisional application No. 60/930,607, filed on May 17, 2007, provisional application No. 60/928,883, filed on May 10, 2007, provisional application No. 60/873,632, filed on Dec. 8, 2006, provisional application No. 60/873,889, filed on Dec. 8, 2006.

(51) Int. Cl.
*G06F 17/30* (2006.01)

(52) U.S. Cl. ............... 707/758; 707/737; 707/E17.046; 711/100; 711/103; 711/108

(58) Field of Classification Search .......... 707/999.003, 707/999.006, 999.107, 737, 758, E17.046; 711/100, 103, 108

See application file for complete search history.

(56) References Cited

U.S. PATENT DOCUMENTS

| | | | |
|---|---|---|---|
| 6,778,557 B1 * | 8/2004 | Yuki et al. | 370/468 |
| 6,892,237 B1 | 5/2005 | Gai et al. | |
| 7,353,332 B2 | 4/2008 | Miller et al. | |
| 7,464,254 B2 * | 12/2008 | Sharangpani et al. | 712/300 |
| 7,660,140 B1 | 2/2010 | Joshi et al. | |
| 7,685,254 B2 | 3/2010 | Pandya | |
| 2002/0161664 A1 * | 10/2002 | Shaya et al. | 705/26 |
| 2004/0059443 A1 | 3/2004 | Sharangpani | |

(Continued)

OTHER PUBLICATIONS

PCT International Search Report and Written Opinion of the International Searching Authority mailed on Apr. 30, 2008 regarding PCT/US2007/86785 filed on Dec. 7, 2007, (13 pgs.).

(Continued)

*Primary Examiner*—Leslie Wong
(74) *Attorney, Agent, or Firm*—DLA Piper LLP US

(57) ABSTRACT

Memory architecture provides capabilities for high performance content search. The architecture creates an innovative memory that can be programmed with content search rules which are used by the memory to evaluate presented content for matching with the programmed rules. When the content being searched matches any of the rules programmed in the Programmable Intelligent Search Memory (PRISM) action(s) associated with the matched rule(s) are taken. Content search rules comprise of regular expressions which are converted to finite state automata and then programmed in PRISM for evaluating content with the search rules. The PRISM memory provides features for complex regular expression symbols like range detection, complement control, bit masking and the like and enables complex symbols and compact regular expression representation.

16 Claims, 11 Drawing Sheets

Programmable Intelligent Search Memory (PRISM) Block Diagram

U.S. PATENT DOCUMENTS

| | | | |
|---|---|---|---|
| 2004/0083387 A1* | 4/2004 | Dapp et al. | 713/201 |
| 2004/0215593 A1* | 10/2004 | Sharangpani et al. | 707/1 |
| 2005/0012521 A1 | 1/2005 | Sharangpani et al. | |
| 2005/0052934 A1 | 3/2005 | Tran | |
| 2005/0108518 A1* | 5/2005 | Pandya | 713/151 |
| 2005/0216770 A1 | 9/2005 | Rowett et al. | |
| 2006/0085533 A1* | 4/2006 | Hussain et al. | 709/223 |
| 2006/0136570 A1* | 6/2006 | Pandya | 709/217 |
| 2006/0253816 A1 | 11/2006 | Gould et al. | |
| 2007/0061884 A1* | 3/2007 | Dapp et al. | 726/23 |
| 2007/0255894 A1 | 11/2007 | Hessel et al. | |
| 2008/0008202 A1* | 1/2008 | Terrell et al. | 370/401 |
| 2008/0046423 A1* | 2/2008 | Alicherry et al. | 707/6 |
| 2008/0133517 A1* | 6/2008 | Kapoor et al. | 707/6 |
| 2008/0255839 A1 | 10/2008 | Larri et al. | |
| 2009/0100055 A1* | 4/2009 | Wang | 707/6 |

OTHER PUBLICATIONS

Ville Laurikari, "NFAs with Tagged Transitions, Their Conversion to Deterministic Automata and Application to Regular Expressions", Seventh International Symposium on String Processing Infomratino Retrieval (SPIRE'00), Sep. 27-29, 2000.

Gerard Berry et al., "From Regular Expressions to Deterministic Automata", Theoretical Computer Science, vol. 48, pp. 117-126 (1986).

Bruce W. Watson, "A Taxonomy of Finite Automata Contruction Algorithms", Computing Science, May 18, 1994.

Sailesh Kumar et al., "Algorithms to Accelerate Multiple Regular Expression Matching for Deep Packet Inspection", SIGCOMM'06, Sep. 11-15, 2006, Pisa, Italy, pp. 339-350.

Reetinder Sidhu et al., "Fast Regular Expression Matching Using FPGAs", Proceedings of the 9th Annual IEEE Symposium of Field-Programmable Custom Computing Machines, pp. 227-238 (2001).

Alfred V. Aho et al., "Efficient String Matching: An Aid to Bibliographic Search", Communication of the ACM, vol. 18, No. 6, pp. 333-340, Jun. 1975.

James Moscola et al., "Implementation of a Content-Scanning Module for an Internet Firewall", Proceedings of the 11th Annual IEEE Symposium on Field-Programmable Custom Computing Machines, pp. 31, 2003 (9 pages).

Sarang Dhamapurikar et al., "Deep Packet Inspection Using Parallell Bloom Filters", Hot Interconnects 11, IEEE Computer Society, pp. 52-61, Jan. 2004.

Ken Thompson, "Regular Expression Search Algorithm", Communication of the ACM, vol. 11, No. 6, pp. 419-422, Jun. 1968.

S.C. Kleene, "Representation of Events in Nerve Nets and Finite Automata", In Automata Studies, C.E. Shannon and J. McCarthy (eds.), Princeton, University Press, 1956, pp. 3-40.

M. O. Rabin et al., "Finite Automata and Their Decision Problems", IBM Journal, pp. 114-125, Apr. 1959.

John E. Hopcroft et al., "Introduction to Automata Theory, Language, and Computation", Addison-Wesley Publishing Company, 1979.

Alfred V. Aho et al., "Compilers: Principles, Techniques, and Tools", Pearson Education Inc., 2007.

File History of U.S. Appl. No. 11/952,028, electronically captured from PAIR on Jun. 16, 2010.

File History of U.S. Appl. No. 11/952,043, electronically captured from PAIR on Jun. 16, 2010.

File History of U.S. Appl. No. 11/952,103, electronically captured from PAIR on Jun. 16, 2010.

File History of U.S. Appl. No. 11/952,104, electronically captured from PAIR on Jun. 16, 2010.

File History of U.S. Appl. No. 11/952,108, electronically captured from PAIR on Jun. 16, 2010.

File History of U.S. Appl. No. 11/952,110, electronically captured from PAIR on Jun. 16, 2010.

File History of U.S. Appl. No. 11/952,111, electronically captured from PAIR on Jun. 16, 2010.

File History of U.S. Appl. No. 11/952,114, electronically captured from PAIR on Jun. 16, 2010.

File History of U.S. Appl. No. 11/952,117, electronically captured from PAIR on Jun. 16, 2010.

Notice of Allowance issued in U.S. Appl. No. 11/952,103, mailed Jun. 28, 2010.

Notice of Allowance issued in U.S. Appl. No. 11/952,104, mailed Jun. 30, 2010.

Amendment filed Aug. 12, 2010 in U.S. Appl. No. 11/952,108.
Amendment filed Aug. 12, 2010 in U.S. Appl. No. 11/952,110.
Amendment filed Aug. 12, 2010 in U.S. Appl. No. 11/952,114.
Amendment filed Aug. 12, 2010 in U.S. Appl. No. 11/952,117.

Office Action issued in U.S. Appl. No. 11/952,111, mailed Sep. 20, 2010.

Office Action issued in U.S. Appl. No. 11/952,028, mailed Sep. 22, 2010.

* cited by examiner

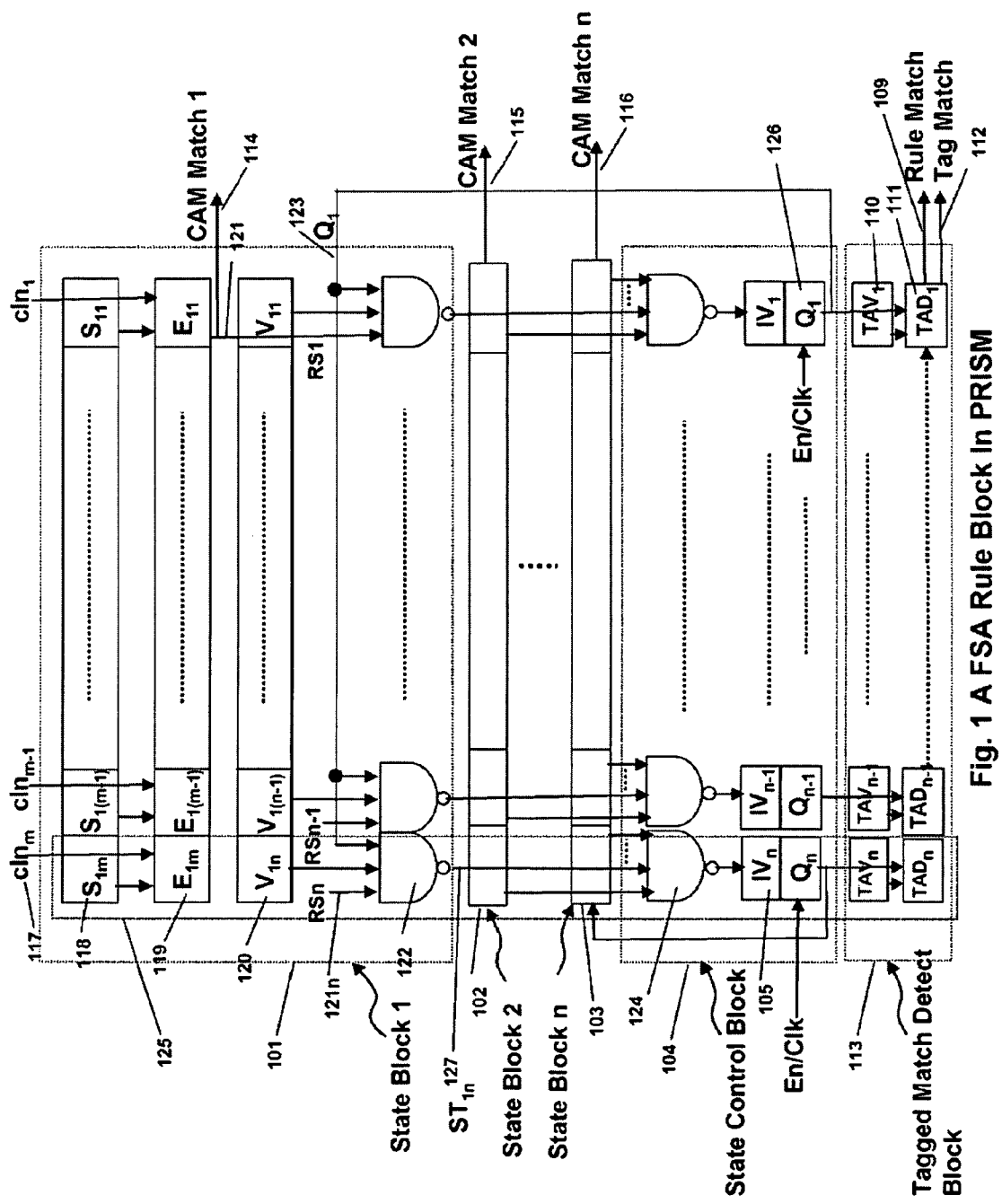
Fig. 1 A FSA Rule Block in PRISM

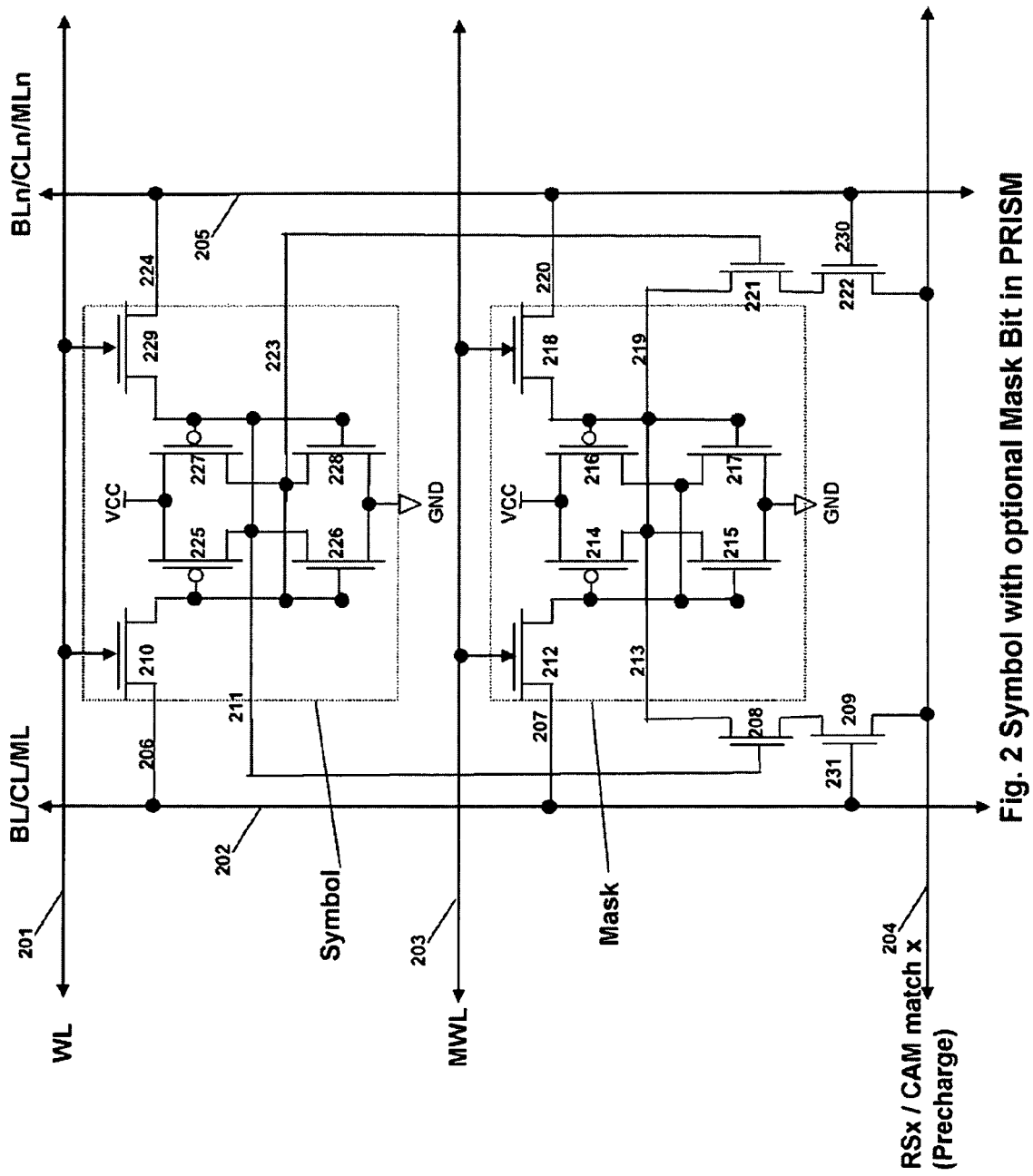
Fig. 2 Symbol with optional Mask Bit in PRISM

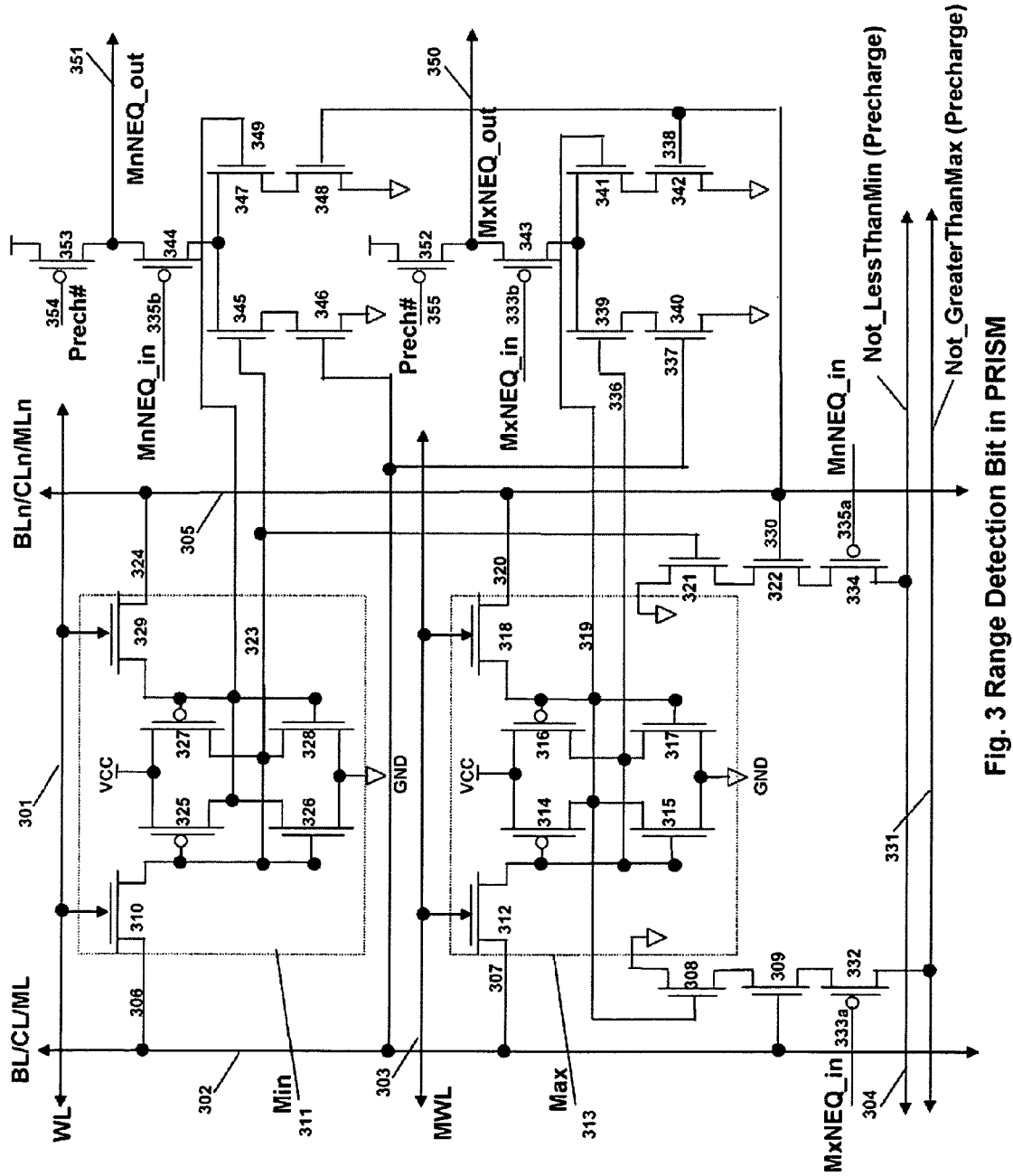
Fig. 3 Range Detection Bit in PRISM

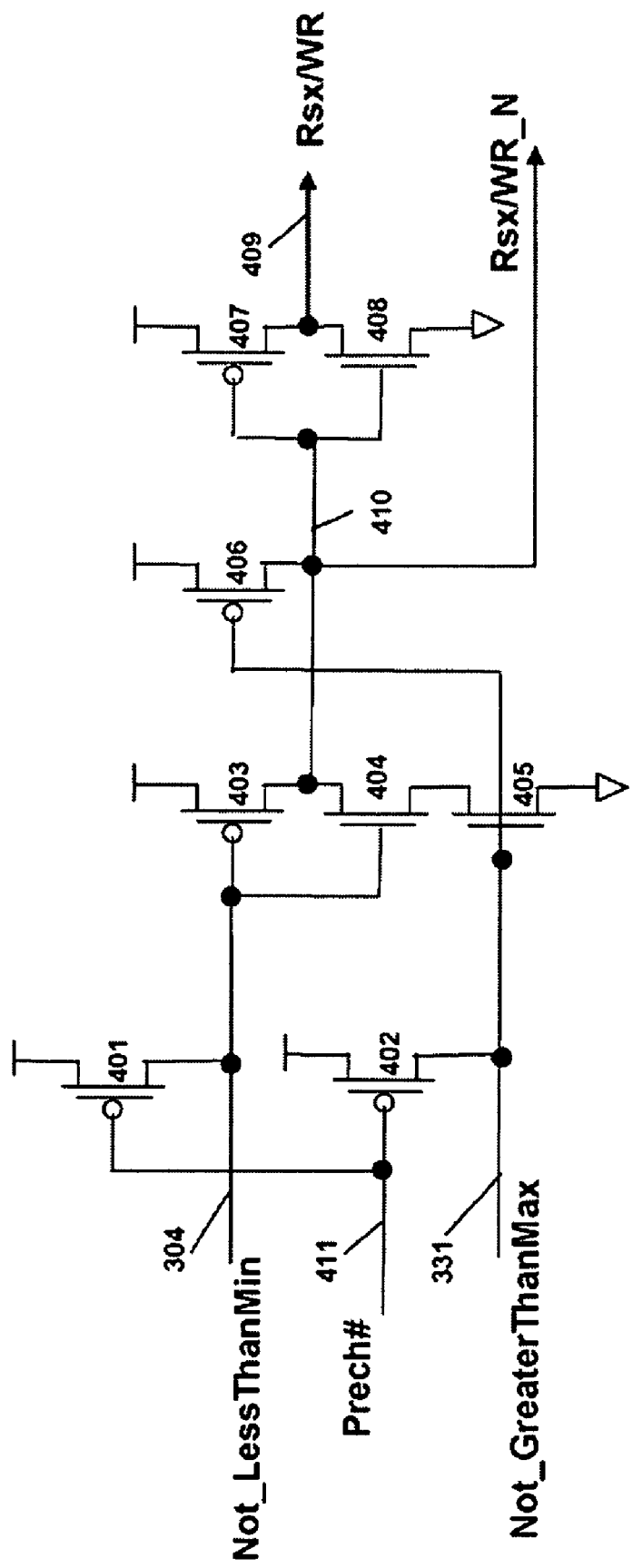
Fig. 4 Range Detect for an FSA state in PRISM

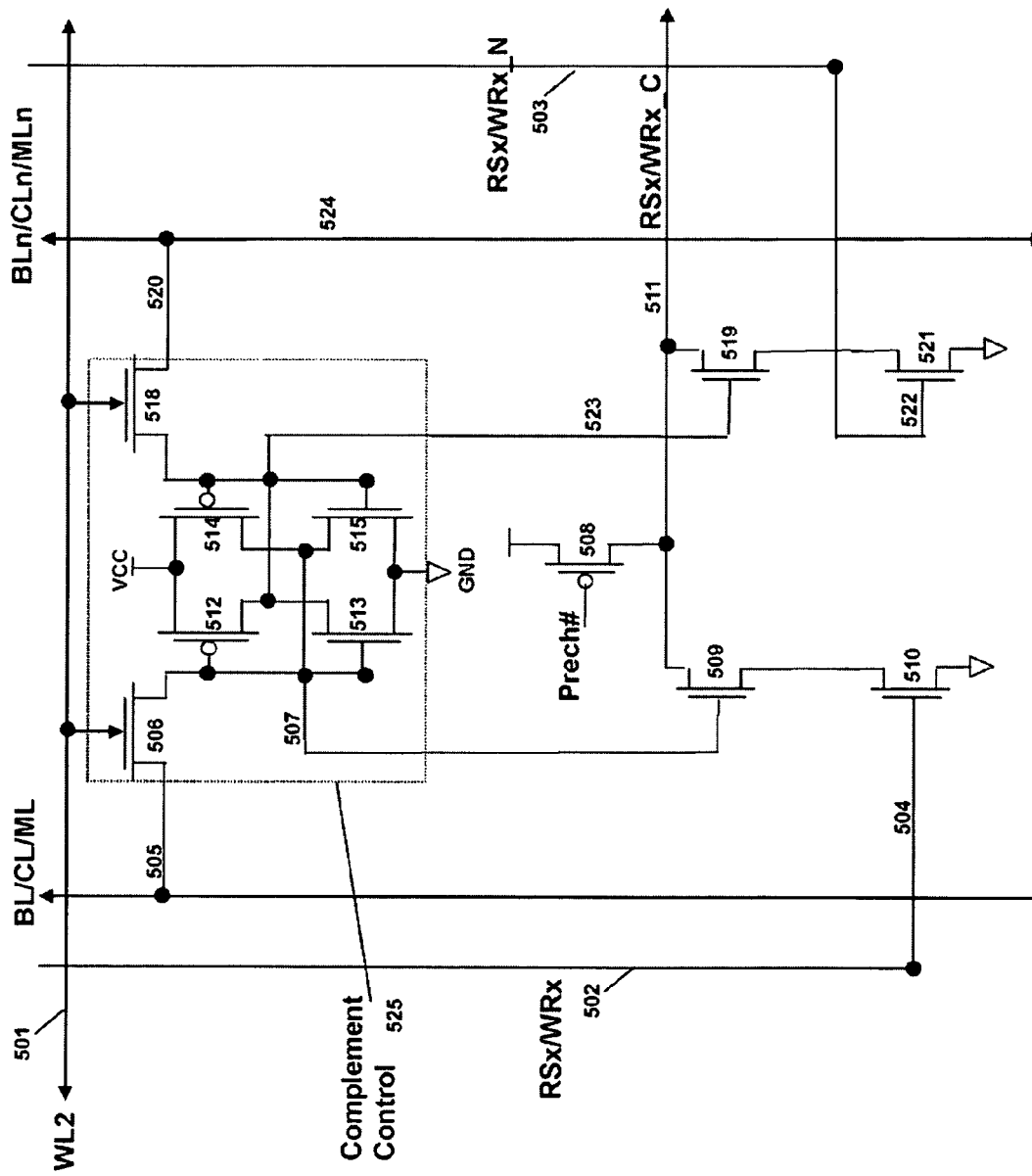
Fig. 5 Complement Logic for an FSA state in PRISM

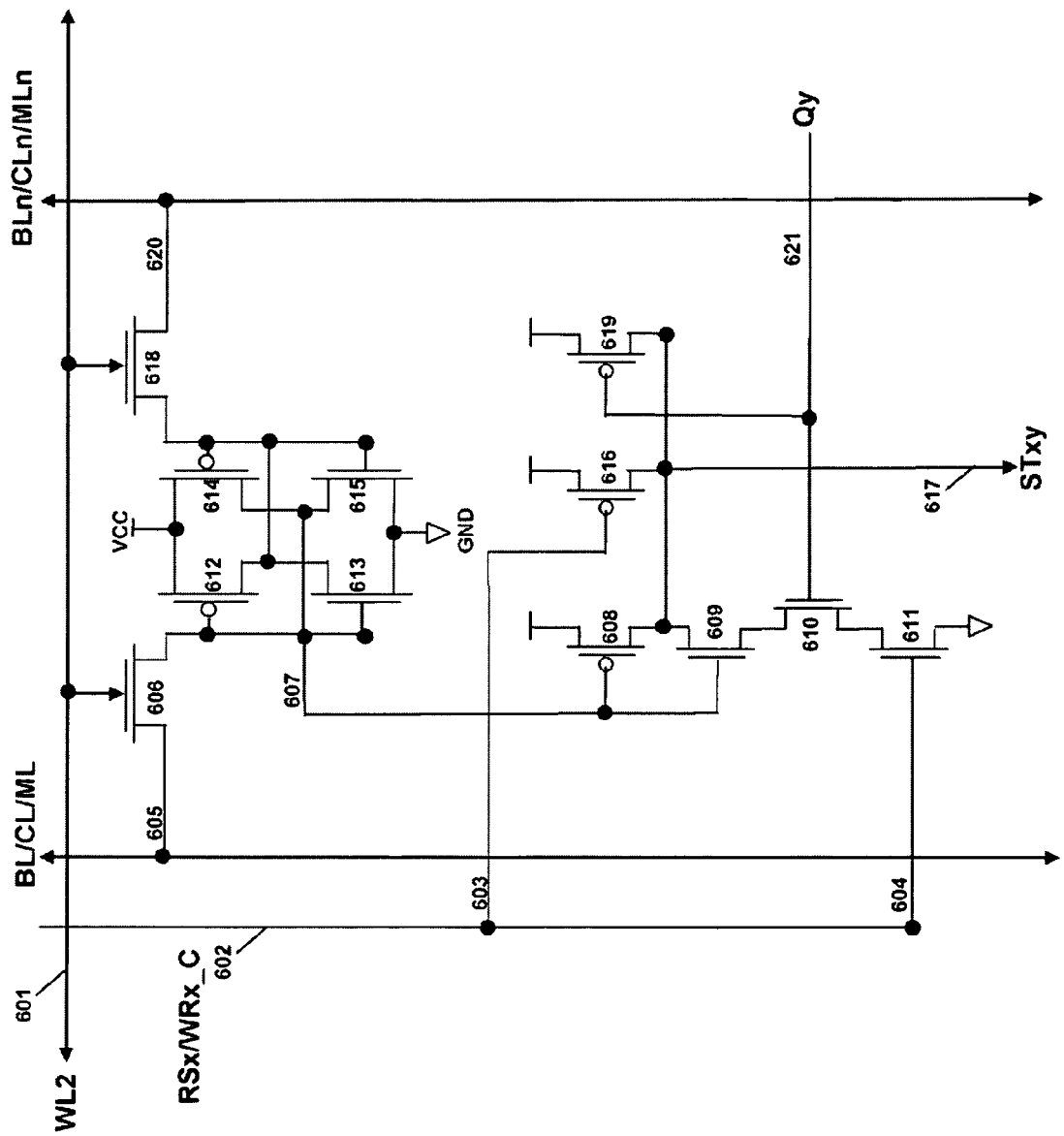
Fig. 6 Partial State Bit in PRISM

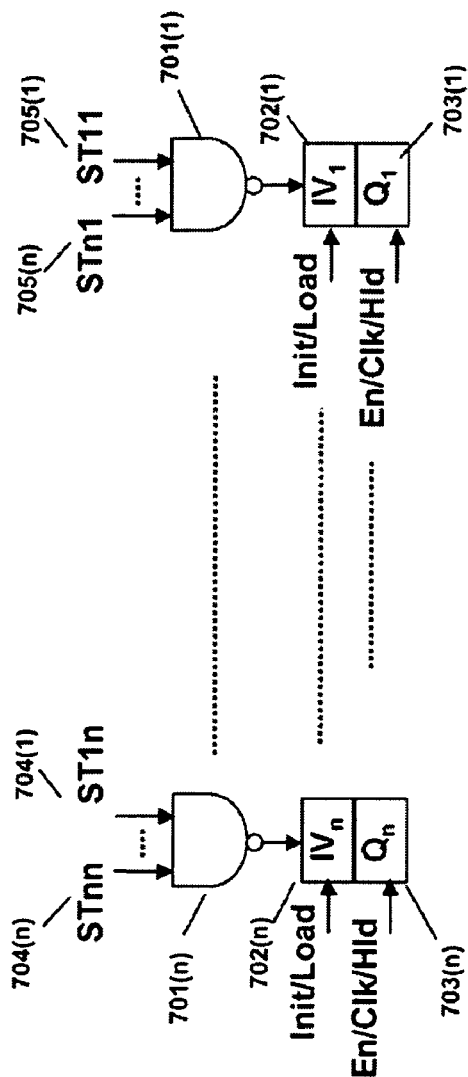
Fig. 7a State Control Block in PRISM
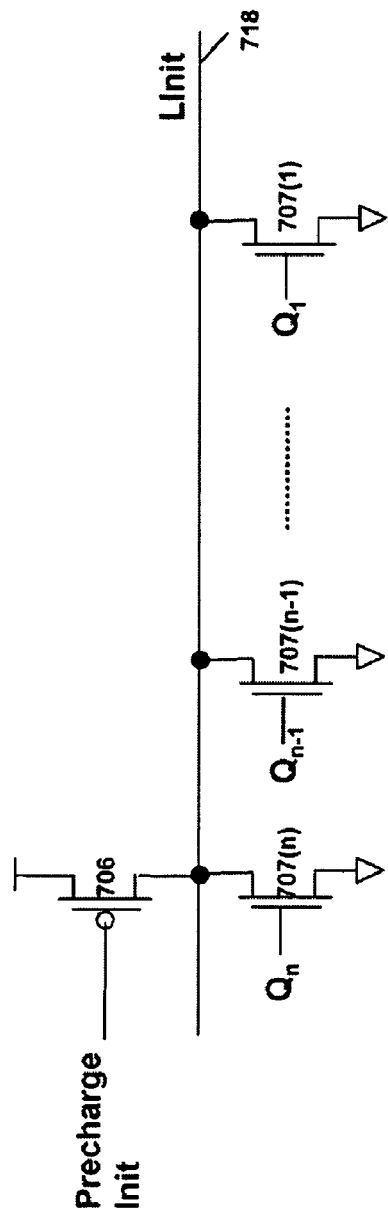
Fig. 7b Local Init Detect Circuit in PRISM

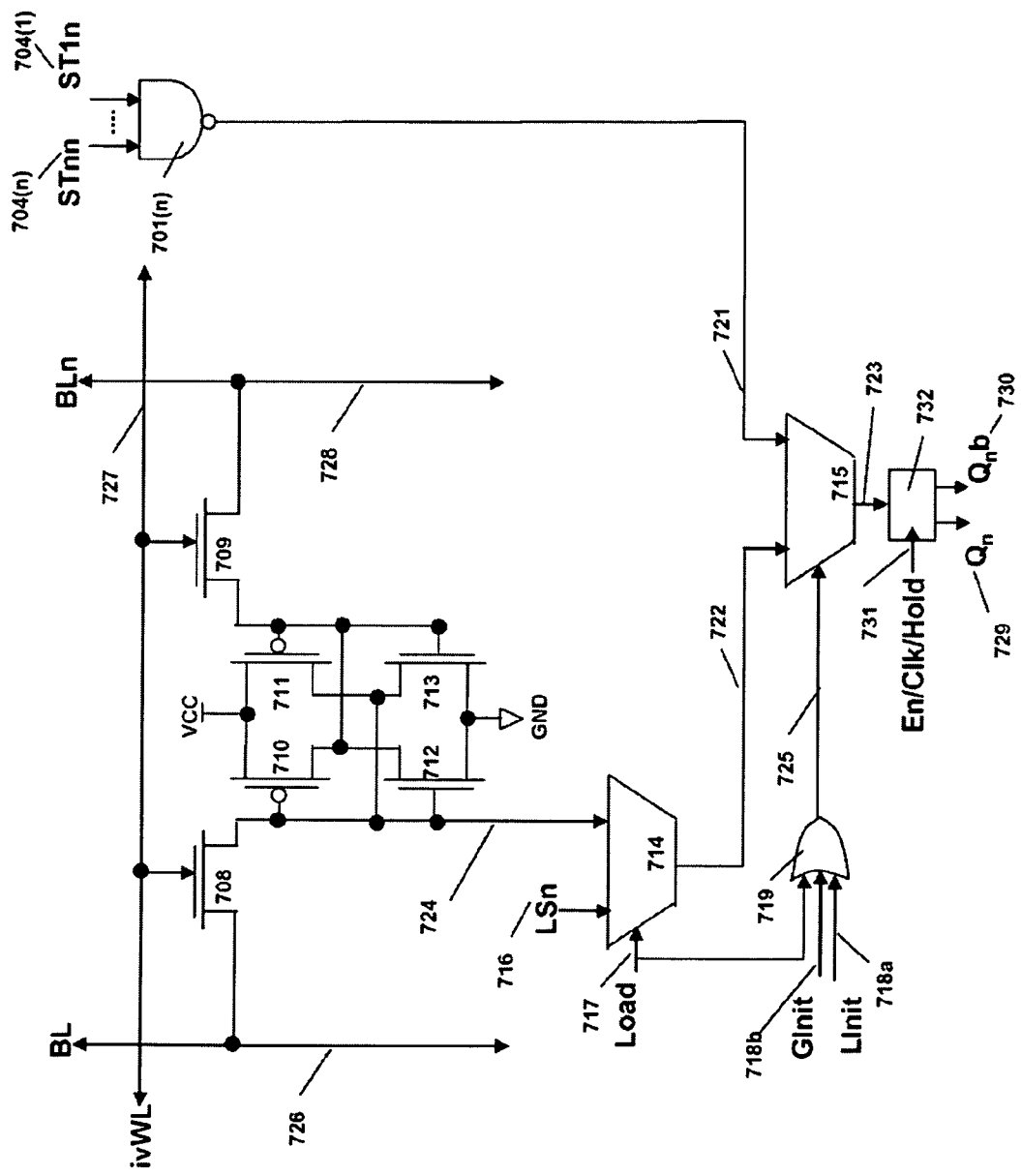
Fig. 7c State Control Block Bit in PRISM

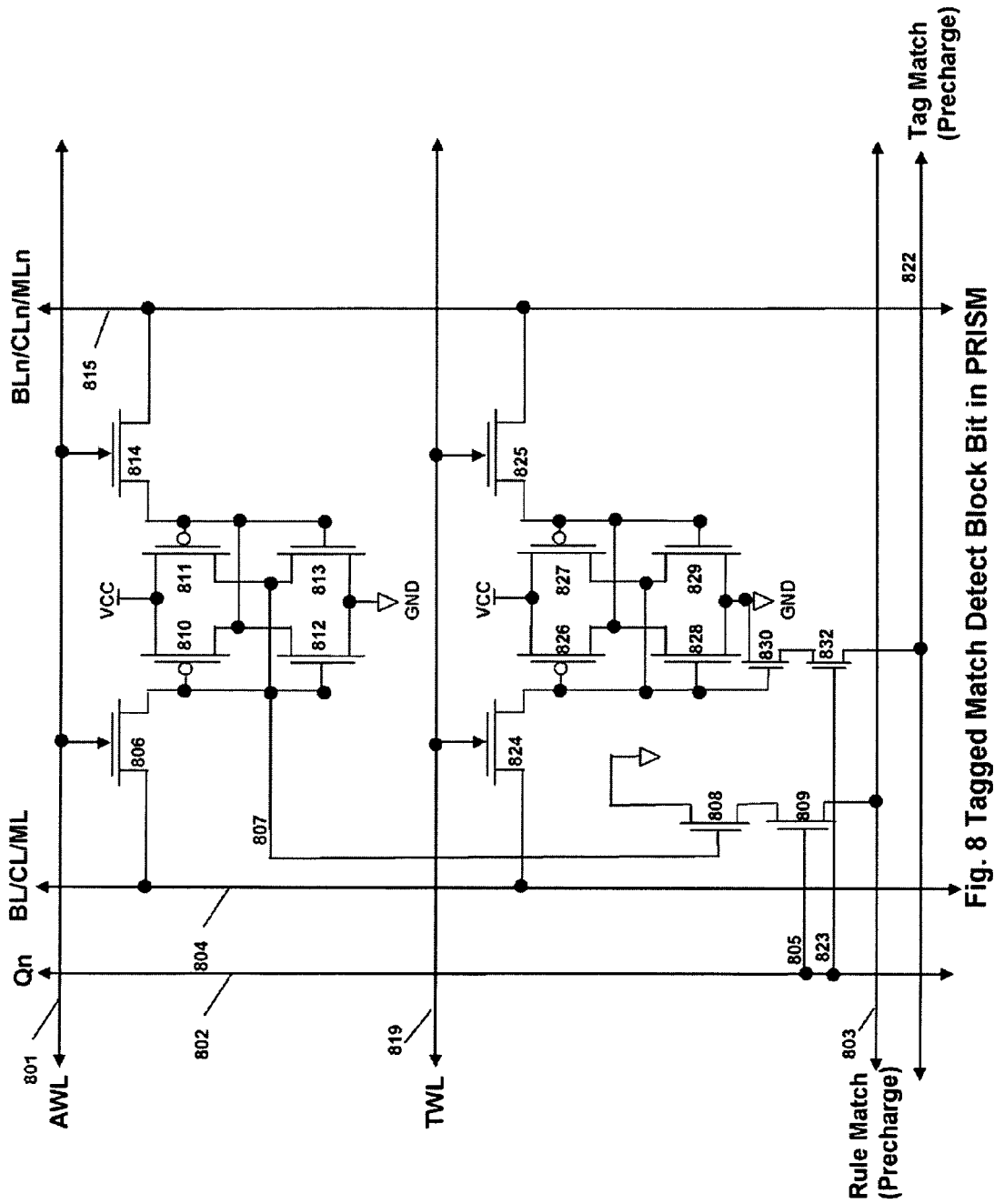
Fig. 8 Tagged Match Detect Block Bit in PRISM

Regular Expression: (a*bc?d) | (efg)+ — 901

Complex Symbol 1: [a-z]+ — 902

Complex Symbol 2: [0-9]+ — 903

Complex Symbol 3: [^abc] — 904

Complex Symbol 4: /abc/i — 905

Complex Symbol 5: [^\ ] — 906

Fig. 9 A Regular Expression and Complex Symbols

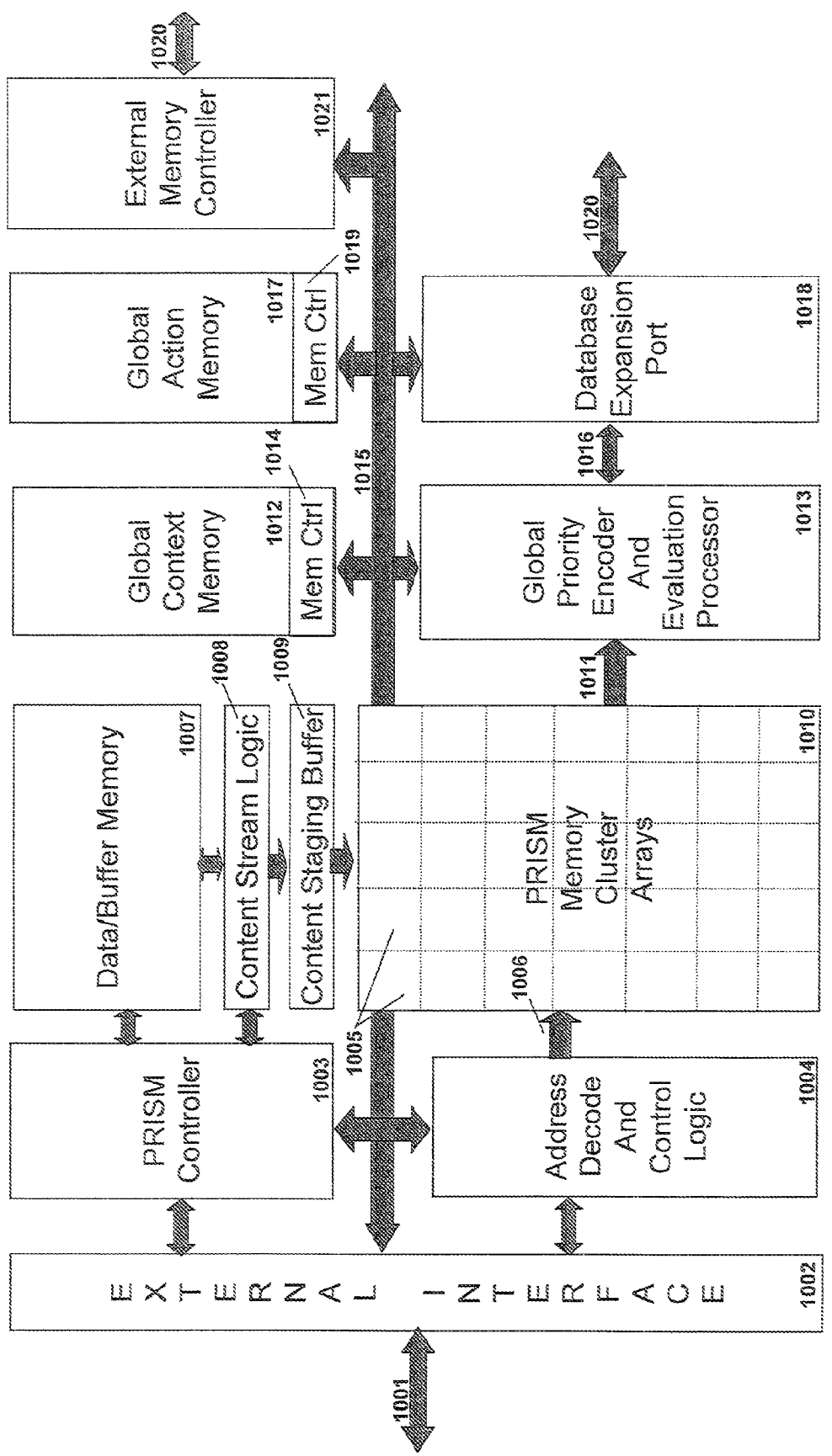
Fig. 10 Programmable Intelligent Search Memory (PRISM) Block Diagram

COMPLEX SYMBOL EVALUATION FOR PROGRAMMABLE INTELLIGENT SEARCH MEMORY

RELATED APPLICATIONS

Priority is claimed to Provisional Application Ser. No. 60/965,267 filed on Aug. 17, 2007 entitled Embedded programmable intelligent search memory, Provisional Application Ser. No. 60/965,170 filed on Aug. 17, 2007 entitled 100 Gbps security and search architecture using programmable intelligent search memory, Provisional Application Ser. No. 60/963,059 filed on Aug. 1, 2007 entitled Signature search architecture for programmable intelligent search memory, Provisional Application Ser. No. 60/961,596 filed on Jul. 23, 2007 entitled Interval symbol architecture for programmable intelligent search memory, Provisional Application Serial No. 60/933,313 filed on Jun. 6, 2007 entitled FSA context switch architecture for programmable intelligent search memory, Provisional Application Ser. No. 60/933,332 filed on Jun. 6, 2007 entitled FSA extension architecture for programmable intelligent search memory, Provisional Application Ser. No. 60/930,607 filed on May 17, 2007 entitled Compiler for programmable intelligent search memory, Provisional Application Ser. No. 60/928,883 filed on May 10, 2007 entitled Complex symbol evaluation for programmable intelligent search memory, Provisional Application Ser. No. 60/873,632 filed on Dec. 8, 2006 entitled Programmable intelligent search memory, Provisional Application Ser. No. 60/873,889 filed on Dec. 8, 2006 entitled Dynamic programmable intelligent search memory, which are all incorporated herein by reference in their entirety as if fully set forth herein.

Priority is also claimed to U.S. Patent Application number not yet assigned filed on Dec. 6, 2007 entitled Embedded programmable intelligent search memory, U.S. Patent Application number not yet assigned filed on Dec. 6, 2007 entitled 100 Gbps security and search architecture using programmable intelligent search memory, U.S. Patent Application number not yet assigned filed on Dec. 6, 2007 entitled Signature search architecture for programmable intelligent search memory, U.S. Patent Application number not yet assigned filed on Dec. 6, 2007 entitled Interval symbol architecture for programmable intelligent search memory, U.S. Patent Application number not yet assigned filed on Dec. 6, 2007 entitled FSA context switch architecture for programmable intelligent search memory, U.S. Patent Application number not yet assigned filed on Dec. 6, 2007 entitled FSA extension architecture for programmable intelligent search memory, U.S. Patent Application number not yet assigned filed on Dec. 6, 2007 entitled Compiler for programmable intelligent search memory, U.S. Patent Application number not yet assigned filed on Dec. 6, 2007 entitled Programmable intelligent search memory, U.S. Patent Application number not yet assigned filed on Dec. 6, 2007 entitled Dynamic programmable intelligent search memory which are all co-pending U.S. patent applications of common ownership.

BACKGROUND OF THE INVENTION

This invention relates generally to memory technology and in particular to a new high performance intelligent content search memory.

Many modern applications depend on fast information search and retrieval. With the advent of the world-wide-web and the phenomenal growth in its usage, content search has become a critical capability. A large number of servers get deployed in web search applications due to the performance limitations of the state of the art microprocessors for regular expression driven search.

There have been significant research and development resources devoted to the topic of searching of lexical information or patterns in strings. Regular expressions have been used extensively since the mid 1950s to describe the patterns in strings for content search, lexical analysis, information retrieval systems and the like. Regular expressions were first studied by S. C. Kleene in mid-1950s to describe the events of nervous activity. It is well understood in the industry that regular expression (RE) can also be represented using finite state automata (FSA). Non-deterministic FSA (NFA) and deterministic FSA (DFA) are two types of FSAs that have been used extensively over the history of computing. Rabin and Scott were the first to show the equivalence of DFA and NFA as far as their ability to recognize languages in 1959. In general a significant body of research exists on regular expressions. Theory of regular expressions can be found in "Introduction to Automata Theory, Languages and Computation" by Hoperoft and Ullman and a significant discussion of the topics can also be found in book "Compilers: Principles, Techniques and Tools" by Aho, Sethi and Ullman.

Regular expressions (RE) can be used to represent the content search strings for a variety of applications. A set of regular expressions can then form a rule set for searching for a specific application and can be applied to any document, file, message, packet or stream of data for examination of the same. Regular expressions are used in describing anti-spam rules, anti-virus rules, intrusion detection and intrusion prevention rules, anti-spyware rules, anti-phishing rules, extrusion detection rules, digital rights management rules, legal compliance rules, worm detection rules, instant message inspection rules, VOIP security rules, XML document security and search constructs, genetics, proteomics, XML based protocols like XMPP, web search, database search, bioinformatics, signature recognition, speech recognition, web indexing and the like. These expressions get converted into NFAs or DFAs for evaluation on a general purpose processor. However, significant performance and storage limitations arise for each type of the representation. For example an N character regular expression can take up to the order of $2^n$ memory for the states of a DFA, while the same for an NFA is in the order of N. On the other hand the performance for the DFA evaluation for an M byte input data stream is in the order of M memory accesses and the order of (N*M) processor cycles for the NFA representation on modern microprocessors.

SUMMARY OF THE INVENTION

I describe complex symbol evaluation circuits for a high performance Programmable Intelligent Search Memory™ for searching content with regular expressions as well as other pattern searches. The high performance programmable intelligent content search memory using regular expression based searches can have uses wherever any type of content needs to be searched for example in networking, storage, security, web search applications, XML processing, bio informatics, signature recognition, genetics, proteomics, speech recognition, database search, enterprise search and the like. The programmable intelligent search memory of my invention may be embodied as independent PRISM memory integrated circuits working with or may also be embodied within microprocessors, multi-core processors, network processors, TCP Offload Engines, network packet classification engines, protocol processors, regular expression processors, content search processors, network search engines, content addressable memories, mainframe computers, grid computers, servers, workstations, personal computers, laptops, notebook computers, PDAs, handheld devices, cellular phones, wired or wireless networked devices, switches, routers, gateways, unified threat management devices, firewalls, VPNs, intrusion detection and prevention systems, extrusion detection systems, compliance management systems, wearable computers, data warehouses, storage area network devices, storage systems, data vaults, chipsets and the like or their derivatives or any combination thereof.

PRISM is a new class of memory technology that implements regular expression (RE) based content search with a large number of parallel FSA evaluations. The regular expression rules. are converted into a data structure that can be loaded or programmed in to PRISM, where a RE may be programmed in a FSA block. The PRISM FSA circuits receive incoming packets or data and compare each incoming character or symbol with the rules stored or programmed in PRISM, performing a large number of simultaneous evaluations. Most symbol evaluations are comparison operators for basic regular expressions. However, popular programming languages with regular expressions use more advanced and compact notations to represent the rules. For example there may be a rule that looks for only alphabets in the input packet stream and may be denoted by a class or range of characters like [a-z]+ which means the rule should match any series of lower case alphabets. In such a rule, each character to be looked at is not explicitly specified but is implied in the range of characters. The same rule may be expressed as [a|b|c|d|e . . . |z]+ or as independent per character rules though the specification [a-z]+ is more compact. It is advantageous to have complex rules like it to be evaluated easily in PRISM instead of expanding such rules to multiple rules using more resources. Regular expressions may also use complement rules to detect any matching string that exclude a certain symbol for example [^abc], block 904, matches any character except characters a, b, or c. A convenient way of representing complemented rules is required in PRISM. Many regular expression rules also indicate that the case of the alphabets may be ignored for example /abc/i, block 905, which finds strings abc, Abc, aBC, and the like by matching searched data with characters in upper-case or lower-case.

I describe complex symbol evaluation circuits for PRISM to handle complex regular expression constructs like those described above.

I describe programmable intelligent search memory in this invention for complex symbol based search. I also show search memory architecture for performing a large number of regular expression searches at high line rates. I also show how my search memory architecture can be configured to behave like content addressable memory which can be very advantageous in applications that require a combination of searches that may be done using CAMs and deep packet content searches requiring regular expression search. I describe a content search memory which performs content search using regular expressions represented as left-biased or right-biased NFAs. My invention also provides capabilities to support Tagged NFA implementations. My invention also shows how content search memory can be used to provide application acceleration through search application programmer interface and the search memory of this invention. For clarity, as used in this patent the terms "programmable intelligent search memory", "search memory", "content search memory", or "PRISM memory" are used interchangeably and have the same meaning unless specifically noted. Further for clarity, as used in this patent the term "memory" when used independently is used to refer to random access memory or RAM or Dynamic RAM (DRAM) or DDR or QDR or RLDRAM or RDRAM or FCRAM or Static RAM (SRAM) or read only memory (ROM) or FLASH or cache memory or the like or any future derivatives of such memories.

The regular expressions may optionally be tagged to detect sub expression matches beside the full regular expression match. The regular expressions are converted into equivalent FSAs that may optionally be NFAs and may optionally be converted into tagged NFAs. The PRISM memory also optionally provides ternary content addressable memory functionality. So fixed string searches may optionally be programmed into the PRISM memory of my invention. PRISM memory of this invention enables a very efficient and compact realization of intelligent content search using FSA to meet the needs of current and emerging content search applications. Unlike a regular expression processor based approach, the PRISM memory can support tens of thousands to over hundred thousand content search rules defined as regular expressions as well as patterns of strings of characters.

The PRISM memory performs simultaneous search of regular expressions and other patterns (also referred to as "rules" or "regular expression rules" or "pattern search rules" or "patterns" or "regular expressions" in this patent) against the content being examined. The content may be presented to the search memory by a companion processor or PRISM controller or content stream logic or a master processor or the like which may be on the same integrated circuit chip as the PRISM memory or may be on a separate device. The content to be searched may be streaming content or network packets or data from a master processor or data from a disk or a file or reside in on-chip memory or off-chip memory or buffers or the like from which a controller may present it to the search memory arrays for examination. The content search memory arrays may initially be configured with the regular expression rules converted into NFAs or tagged NFAs and optionally other pattern search rules. PRISM memory may optionally comprise of configuration control logic which may be distributed or central or a combination thereof. The configuration control logic may optionally address PRISM memory cells to read and/or write FSA rules or other patterns to be searched. Once the PRISM memory is setup with all the related information about the NFAs and other rules, the content to be examined can be presented to the PRISM memory. PRISM memory provides capabilities to update rules or program new rules or additional rules, in line with the content examination within a few clock cycles unlike the current regular expression processors which require the content evaluation to stop for long periods of time until large tables of composite DFAs are updated in an external or internal memory. Typically the content is presented as a stream of characters or symbols which get examined against the rules in the PRISM memory simultaneously and whenever a rule is matched the PRISM memory array provides that indication as a rule match signal which is interpreted by the control logic of the PRISM and action associated with such rule match may be triggered or taken or a combination thereof. There may be multiple rule matches simultaneously in which case a priority encoder which may also be programmable is used to select one or more matches as the winner(s). The priority encoder may then provide a tag or an address or an action or a combination that may have already been programmed in the priority encoder which may be used to look-up related data from associated on-chip or off-chip memory that may optionally determine the next set of actions that may need to be taken on the content being examined. For example, in case of a security application if a set of regular expressions are defined and programmed for spam detection, then if one or more of these rules when matched can have action(s) associated with them that the message or content may need to quarantined for future examination by a user or it can have an action that says the content should be dropped or enable a group of regular expressions in the PRISM memory to be applied to the content or the like depending on the specific application. The PRISM memory architecture comprises of means or circuits or the like for programming and reprogramming of the FSA rules and optionally CAM signatures and masks. It further comprises of means or circuits or the like to stream the content to be searched to the PRISM memory arrays. It may further comprise of priority encoder which may optionally be programmable. The PRISM memory may optionally comprise of random access memory (on-chip or off-chip) which is used to store actions associated with specific rule matches. The PRISM memory may optionally comprise of database extension ports which may be optionally used when the number of rules is larger than those that may fit in a single integrated circuit chip. The PRISM memory may optionally comprise of clusters of PRISM memory cells that enable a group of FSA rules to be programmed per cluster. The PRISM clusters may optionally comprise of memory for fast storage and retrieval of FSA states for examination of content that belongs to different streams or contexts or flows or sessions or the like as described below referred to as context memory. For clarity, context memory or global context memory or local context memory or cluster context memory, all comprise of memory like random access memory or RAM or Dynamic RAM (DRAM) or DDR or QDR or RLDRAM or RDRAM or FCRAM or Static RAM (SRAM) or read only memory (ROM) or FLASH or cache memory or the like or any future derivatives of such memories as discussed above. The PRISM memory may optionally comprise of global context memory beside local cluster context memory for storage and retrieval of FSA states of different contexts and enable supporting a large number of contexts. The cluster context memory may optionally cache a certain number of active contexts while the other contexts may be stored in the global context memory. There may optionally be off-chip context memory as well, which can be used to store and retrieve FSA states for much larger number of contexts. The PRISM memory may optionally comprise of cache or context control logic (also referred as "context controller") that manages the cluster, global or external context memory or cache or a combination thereof. The cache or context control logic may optionally be distributed per cluster or may be central for the PRISM memory or any combination thereof. The PRISM controller or the content stream logic that streams the content to be searched may be provided with an indication of the context of the content being searched or it may detect the context of the content or a combination thereof, and may optionally direct the context memory and associated control logic i.e. the context controller to get the appropriate context ready. Once the context memory has the required context available an indication may be provided to PRISM configuration control logic that it may program or load the context states in the PRISM memory. The PRISM configuration control logic (also referred as "configuration controller" in this patent) may optionally first save the current context loaded in the set of active FSA blocks before loading the new context. The configuration controller(s) and the context controller(s) may thus optionally store and retrieve appropriate contexts of the FSAs and start searching the content against the programmed rules with appropriate context states of the FSAs restored. Thus PRISM memory may optionally dynamically reconfigure itself at run-time based on the context of the content or the type of the application or the like or a combination thereof enabling run-time adaptable PRISM memory architecture. The contexts as referred to in this patent may, as examples without limitation, be related to specific streams, or documents, or network connections or message streams or sessions or the like. The PRISM memory may process content from multiple contexts arriving in data groups or packets or the like. For content search in applications where the content belonging to one context may arrive interspersed with content from other contexts, it may be important to maintain the state of the content searched for a context up to the time when content from a different context gets searched by PRISM memory.

The context memory or cache with the associated controllers as described in this patent enable handling of multiple contexts.

For clarification, the description in this patent application uses term NFA to describe the NFAs and optionally, when tagging is used in regular expressions, to describe tagged NFA unless tagged NFA is specifically indicated. All NFAs may optionally be tagged to form tagged NFAs, hence the description is not to be used as a limiter to apply only to tagged NFAs. The descriptions of this patent are applicable for non-tagged NFAs as well and tagging is an optional function which may or may not be implemented or used, and thus non-tagged NFAs are covered by the teachings of this patent as will be appreciated by one skilled in the art. At various places in this patent application the term content search memory, content search memory, search memory and the like are used interchangeably for programmable intelligent search memory or PRISM memory. These usages are meant to indicate the content search memory or PRISM memory of this invention without limitation.

In many content search applications like security, there is a need to constantly update the rules or the signatures being used to detect malicious traffic. In such applications it is critical that a solution be adaptable to keep up with the constantly evolving nature of the security threat. In an always connected type of usage models, it is extremely important to have the latest security threat mitigation rules updated in the security system on a frequent basis. When a composite DFA type architecture is used, compiling and releasing any new security rules or policy can consume a large amount of time, where the updates may not be timely to avoid the impact of the security threat. In such environments the release of new rule base may take up to 8 to 24 hours, which is quite delayed response to constantly evolving threat. In the architecture of this invention, that issue is addressed since the release of new rules is a matter of converting those rules into NFAs and updating or programming only these very small set of rules into the content search memory. Thus the response to new threats can be near immediate unlike the huge delays which occur from integration of the new rules in the composite rule base and converting those into composite DFAs.

Typically the rules are symbol or character based rules with ability to mask certain bits in a character or symbol. The FSA rules in PRISM, examine each incoming character or symbol with those stored in the FSA block to decide the traversal of the state automaton. There may be 'n' character or symbol comparisons done simultaneously per incoming character or symbol for an n-state FSA. The FSA traverses the states based on the programmed regular expression (RE) and the input stream. Regular expressions typically comprise of single character states, however, more complex rules utilize rules that specify a range of characters as one symbol. For example a rule may evaluate incoming character stream to detect a series of decimal numbers. A RE like [0|1|2|3|4 . . . |9]+ may be used to denote such a rule, which states that the rule should accept one or more (denoted by '+' operator of the RE)

occurrences of any of the decimal digits (symbol '|' denotes an OR condition which is also referred to as alternation in places in this patent). Such a rule when converted to PRISM without support for complex symbols may occupy 10 states, one for each decimal digit, along with additional states for other conditions that this rule may be part of. However, it is possible to represent the same RE using a more compact notation like [0-9]+, block 903, which uses a range notation to describe all decimal digits. It would be advantageous to treat such a notation as a single symbol in PRISM, instead of expanding it into multiple symbols enumerating each digit, which in turn would allow more complex rules to be programmed in a single FSA block.

I describe complex symbol evaluation circuits for PRISM to handle complex regular expression constructs.

This patent also describes a content inspection architecture that may be used for detecting intrusions, extrusions and confidential information disclosure (accidental or malicious or intended), regulatory compliance search using hardware for regulations like HIPAA, Sarbanes-Oxley, Graham-Leach-Bliley act, California security bills, security bills of various states and/or countries and the like, deep packet inspection, detecting spam, detecting viruses, detecting worms, detecting spyware, detecting digital rights management information, instant message inspection, URL matching, application detection, detection of malicious content, and other content, policy based access control as well as other policy processing, content based switching, load balancing, virtualization or other application layer content inspection for application level protocol analysis and processing for web applications based on HTTP, XML and the like and applying specific rules which may enable anti-spam, anti-virus, other security capabilities like anti-spyware, anti-phishing and the like capabilities. The content inspection memory may be used for detecting and enforcing digital rights management rules for the content. The content inspection memory may also be used for URL matching, string searches, content based load balancing, sensitive information search like credit card numbers or social security numbers or health information or the like.

BRIEF DESCRIPTION OF THE DRAWINGS

FIG. 1 illustrates a FSA Rule Block in PRISM
FIG. 2 illustrates Symbol with optional Mask bit in PRISM
FIG. 3 illustrates Range Detection Bit in PRISM
FIG. 4 illustrates Range Detect for an FSA state in PRISM
FIG. 5 illustrates Complement logic for an FSA state in PRISM
FIG. 6 illustrates Partial State Bit in PRISM
FIG. 7a illustrates State Control Block in PRISM
FIG. 7b illustrates Local Init Detect Circuit in PRISM
FIG. 7c illustrates State Control Block Bit in PRISM
FIG. 8 illustrates Tagged Match Detect Block Bit in PRISM
FIG. 9 illustrates A Regular Expression and Complex Symbols
FIG. 10 illustrates a Programmable Intelligent Search Memory (PRISM) Block Diagram

DESCRIPTION

I describe complex symbol evaluation for a high performance Programmable Intelligent Search Memory for searching content with regular expressions as well as other pattern searches. The regular expressions may optionally be tagged to detect sub expression matches beside the full regular expression match. The regular expressions are converted into equivalent FSAs that may optionally be NFAs and may optionally be converted into tagged NFAs. The PRISM memory also optionally supports ternary content addressable memory functionality. So fixed string searches may optionally be programmed into the PRISM memory of my invention. PRISM memory of this invention enables a very efficient and compact realization of regular expression based intelligent content search using FSA to meet the needs of current and emerging content search applications. Unlike a regular expression processor based approach, the PRISM memory can support tens of thousands to hundreds of thousands of content search rules defined as regular expressions as well as patterns of strings of characters. The PRISM memory performs simultaneous search of regular expressions and other patterns. The content search memory can perform high speed content search at line rates from below 1 Gbps to 10 Gbps and higher, when the best of class server microprocessor can only perform the same tasks at well below 100 Mbps. The content search memory can be used not only to perform layer 2 through layer 4 searches that may be used for classification and security applications, it can also be used to perform deep packet inspection and layer 4 through layer 7 content analysis.

Following are some of the embodiments, without limitations, that can implement PRISM memory:

The PRISM memory may be embodied inside network interface cards of servers, workstations, client PCs, notebook computers, handheld devices, switches, routers and other networked devices. The servers may be web servers, remote access servers, file servers, departmental servers, storage servers, network attached storage servers, database servers, blade servers, clustering servers, application servers, content/media servers, VOIP servers and systems, grid computers/servers, and the like. The PRISM memory may also be used inside a chipset of one of the end systems like a server or a workstation or a client computer or a handheld device or the like or network core systems like a switch or router or appliance or the like. The PRISM memory may also be used as a co-processing search engine to a CPU.

The PRISM memory may also be embodied on dedicated content search acceleration cards that may be used inside various systems described in this patent. Alternatively, PRISM memory may also be embodied as a content search memory inside a variety of hardware and/or integrated circuits like ASSPs, ASICs, FPGA, microprocessors, multi-core processors, network processors, TCP Offload Engines, network packet classification engines, protocol processors, regular expression processors, content search processors, mainframe computers, grid computers, servers, workstations, personal computers, laptops, handheld devices, cellular phones, wired or wireless networked devices, switches, routers, gateways, XML accelerators, VOIP servers, Speech recognition systems, bio informatics systems, genetic and proteomics search systems, web search servers, electronic vault application networks and systems, Data Warehousing systems, Storage area network systems, content indexing appliances like web indexing, email indexing and the like, chipsets and the like or any combination thereof. Alternatively, PRISM memory blocks may be embedded inside other memory technologies like DRAM, SDRAM, DDR DRAM, DDR II DRAM, RLDRAM, SRAM, RDRAM, FCRAM, QDR SRAM, DDR SRAM, Content Addressable Memory, Boundary Addressable Memories, Magnetic memories, Flash or other special purpose memories or a combination thereof or future derivates of such memory technologies to enable memory based content search.

One preferred embodiment of the invention is in an integrated circuit memory chip that may support over 100,000 8-symbol regular expression rules in current process technologies. Each process generation may provide ability to store around twice as many rules as the previous generation. Thus in one preferred embodiment the PRISM memory would be able to support tens of thousands of eight-state FSA and can potentially support over 100,000 FSAs. There are many variations of the PRISM memory architecture that can be created that can support more or less FSAs depending upon various factors like the number of states per FSA, the chip die area, cost, manufacturability expectations and the like which will be appreciated by a person of ordinary skill in the art.

DETAILED DESCRIPTION

I describe complex symbol evaluation for a high performance Programmable Intelligent Search Memory for searching content with regular expressions as well as other pattern searches. The regular expressions may optionally be tagged to detect sub expression matches beside the full regular expression match. The regular expressions are converted into equivalent FSAs or NFAs and optionally into tagged NFAs. The PRISM memory also optionally supports ternary content addressable memory functionality. So fixed string searches may optionally be programmed into the PRISM memory of my invention. PRISM memory of this invention enables a very efficient and compact realization of intelligent content search using FSA to meet the needs of current and emerging content search applications. The description here is with respect to one preferred embodiment of this invention in an integrated circuit (IC) chip, however it will be appreciated by those with ordinary skill in the art that changes in these embodiments may be made without departing from the principles and spirit of the invention. The illustrations are made to point out salient aspects of the invention and do not illustrate well understood integrated chip design elements, components like clocks, power, reset and the like for implementation of the invention in integrated circuits so as not to obscure the invention.

Ability to perform content search has become a critical capability in the networked world. As the network line rates go up to 1 Gbps, 10 Gbps and higher, it is important to be able to perform deep packet inspection for many applications at line rate. Several security issues, like viruses, worms, confidential information leaks and the like, can be detected and prevented from causing damage if the network traffic can be inspected at high line rates. In general, content search rules can be represented using regular expressions. Regular expression rules can be represented and computed using FSAs. NFAs and DFAs are the two types of FSAs that are used for evaluation of regular expressions. For high line rate applications a composite DFA can be used, where each character of the input stream can be processed per cycle of memory access. However, this does have a limit on how fast the search can be performed dictated by the memory access speed. Another limiter of such approach is the amount of memory required to search even a modest number of regular expression rules. NFAs also have their limitations to achieve high performance on general purpose processors due to their non-deterministic nature. In general, today's best of class microprocessors can only achieve less than 100 Mbps performance using NFAs or DFAs for a small number of regular expressions. Hence, there is a clear need to create targeted content search acceleration hardware to raise the performance of the search to the line rates of 1 Gbps and 10 Gbps. This invention shows such a high performance content search hardware that can be targeted for high line rates.

As described earlier, regular expression can be represented using FSA like NFA or DFA. Regular expressions, block 901, may typically be expressed as a string of characters which may have additional operators like kleene closure (*), alternation (|), concatenation(.), anchoring(^,$), grouping and the like. For example a rule may comprise of a string like (a*bc?d)|(efg)+, block 901, which matches any string that may have zero or more occurrences (*) of character a, followed by character b, followed by zero or one occurrence of character c, followed by character d or (|) any strings that have one or more occurrence (+) of a sequence of characters efg. Such a regular expression would be converted to an NFA implementation for evaluation in PRISM where each symbol, in this case character, gets associated with a state and the other operators determine the state transition and a combination of the foregoing. However many times regular expression rules are created to represent a range of choices for example a rule like [a-z]+, block 902, would represent strings of one or more characters of the lower case alphabets 'a' through 'z'. PRISM architecture needs to support constructs like these in a compact way to not use up 26-states for such a rule and instead be able to use a single state and treat [a-z] as a single symbol for the regular expression evaluation. Similarly, many content search applications need regular expression rules searching for alphabets in the content by ignoring the case of the alphabets. PRISM comprises construct to support such rules. Further, there are applications that need to have regular expressions that search for content excluding certain characters. For example, multiple spaces in an HTML document is treated as a single space for display, hence a web crawler may have a regular expression like [^\ ]+, block 906, which matches strings that do not include one or more blank spaces. PRISM comprises circuits to enable such searches as well. I describe circuits that enable such complex symbols in PRISM.

PRISM comprises of one or more programmable FSA, where one or more Regular expressions are each converted into a linear NFA(s) by marking and then constructing a corresponding FSA where each state corresponds to each marked symbol of the regular expression and then the markings are removed. The PRISM memory provides a runtime adaptable architecture and in a PRISM FSA all incoming or outgoing transitions to or from a state are based on the same symbol. PRISM enables realization of any arbitrary FSA with n-states where 'n' is a number of states per NFA block or extended NFA blocks or a combination thereof, where a state may be entered from any of the other state based on a n-bit State Dependent Vector (SDV), current state of the FSA represented by an n-state current state vector (CSV) and the received symbol based on received symbol vector (RSV). PRISM memory allows various elements of the FSA blocks, like the state symbols, SDV, CSV, RSV and the like to be programmable memory vectors as discussed below.

A typical usage scenario of PRISM may optionally comprise of multiple phases, where initially each FSA rule block in PRISM, may be setup with all the state symbols of the FSA. Then appropriate symbol mask vectors may be setup to enable or disable evaluation of specific input symbol bit with the stored FSA symbol bit associated with the symbol mask vector. Then state dependent vectors for each of the states may then be stored. Then each accept state vector as well as optional tag state vectors may be setup as well. Even though the foregoing description with a specific order of setting up of the PRISM memory contents, it will be appreciated by one with ordinary skill in the art that a different order or method or a combination may be used to setup each PRISM FSA to be able to evaluate the content against those rules. Once all the FSA rules of interest have been setup in PRISM, would the evaluation of the actual content start.

Each programmable element like a SDV, Symbol, Accept Vector or the like of the PRISM FSA may occupy one memory address each in the PRISM memory space. The PRISM memory may be a contiguous space or may optionally be multiple memory spaces each for a specific type of element, or a combination there of. For instance all the symbols may be mapped in one contiguous memory space, where as all the mask vectors may occupy another contiguous memory space and the like alternatively all programmable elements of an FSA occupy one contiguous memory space or a combination. The PRISM compiler or another software agent or driver or a combination may be aware of the specific memory organization and enable setting up of the appropriate FSA memory elements. All such variations of memory element organization of PRISM are anticipated and covered by this patent application. Once all FSA rules have been setup with appropriate rules, PRISM controller, not illustrated, would present content to be analyzed to the PRISM FSA rule blocks. When any of the FSA rules detect a match, the match is asserted and a priority encoder or a controller or a combination, processes match indication even when multiple simultaneous matches are asserted and prioritizes them for further processing. When a match is indicated, an appropriate action which may optionally be programmed as well, may be taken for example stop processing the content further, or enable a new FSA rule for evaluation or drop the packet or flag the packet or content or the like or a combination thereof.

FIG. 1 illustrates a FSA Rule block in PRISM. FSA of PRISM are optionally tagged. For clarity, FSA rule block, PRISM FSA rule block, PRISM FSA rule memory block, rule block, rule memory block, are used interchangeable in this application. Further, NFA rule block or PRISM NFA rule block or NFA rule memory block, are also used interchangeably and mean a PRISM FSA rule block where the FSA type is an NFA in this patent. The discussion below is with respect to tagged NFA, though it is also applicable for non-tagged NFAs or other FSA types where the tagging elements, described below, are not used or not present. This figure illustrates a state block 1, 101, which comprises of a state symbol memory, block 118, optionally comprises of a symbol evaluation circuit, block 119, optionally comprises a symbol mask memory block (not illustrated in this figure explicitly), optionally comprises of a memory block to store state dependent vector, block 120, and may optionally comprise a partial circuit to evaluate a transition into a state, block 122. The figure illustrates other state blocks, 102 and 103, that represent state blocks 2 through n, where 'n' is the number of states of the NFA or FSA programmed in this PRISM FSA rule block. These blocks are illustrated without detail unlike state block 1. The primary difference between the blocks is that each state block uses only its own state bit from the current state vector (CSV) comprised of current state values for all NFA or FSA states, generates a different bit of received symbol vector (RSV) and different partial state transition signals like line 127. For instance state block 2, generates RS2 by evaluating the received character with the symbol programmed in its symbol memory block, like block 118. The state blocks are organized in a vertical slice like, block 125, where each state block holds portion of the logic necessary to form the final state. In this illustration the state Q1, 126, is generated by processing the outputs from each state blocks' $1^{st}$ slice. The state dependent vector (SDV) bits held in each state block are for transition control in to the specific state from all other states of this NFA or FSA. The NFA illustrated in this figure represents a left-biased construction of the regular expression derived finite state automaton, however it is possible to use the same circuit structure for a right-biased construction, where the SDV vector bits and the RSV vector bits positioning is in different slices and state blocks respectively. The indices $V_{XY}$ block 120, indicate the state dependent vector bit that enables or disables transition from state X to state Y where each X and Y may have a range from 1 through n, where n is the number of states of the FSA. Thus the SDV of a state indicates the controls for enabling transitions from any state to itself. The initialization vector (IV) block, 105, comprises of initialization/start state vector memory bits. The state control block, 104, comprises of logic gates, like 124, which logically NANDs the partial state output, like 127, from the state blocks 1 through state block n.

The state control block, 104, further comprises of the init logic blocks, like 105, and the state memory blocks, like 126. The PRISM FSA Rule block also comprises of tagged match detect block, 113, which may optionally comprise of tagging elements for supporting tagged NFAs. The tagged match detect block comprises of Accept vector memory blocks, like 110, which comprise of accept vector memory bits and may optionally comprise of tag memory bits. The tagged match detect block further comprises of accept detect blocks, like 111, which comprise of accept state detection and may optionally comprise of tagged state or state transition detection circuits. The state memory blocks, like 126, may be controlled be clock or enable or a combination signal to step the FSA rule block through its states as new input characters or symbols are evaluated. The input characters or symbols may be presented to the PRISM FSA rule block in an m-bit wide vector arriving on signals labeled $cln_m$ through $cln_1$. Thus PRISM memory may be used to evaluate one 8-bit character from the input stream at a time if m=8, but may optionally be able to process multiple characters at a time as well to improve the content search performance for example if m=16, two input 8-bit character bytes are evaluated per FSA rule block evaluation step. The clocked enable signals may provide more control over simple clock by enabling when the FSA should be evaluated. For instance upon finding a match, an FSA controller (not illustrated) of PRISM, may be programmed to hold further evaluation of any symbols for this FSA until the match information is processed. The PRISM FSA rule block may optionally generate multiple output signals that can be used to indicate the progress of the FSA. The PRISM FSA rule block outputs comprise of a Rule Match signal, 109, which indicates when the regular expression rule programmed in the PRISM FSA rule block has matched with characters of the input stream. The Rule Match signal may optionally be coupled to a local or global priority encoder and optional evaluation processor of PRISM, which may optionally decide on next steps to be taken optionally based on user programmed actions and/or policies. The priority encoder and evaluation processors may optionally comprise of counters that may be triggered upon specific rule matches. The counters may be used for several purposes like statistical events monitoring, match location detection in the input stream and the like. The priority encoders may also decide the highest priority winner if multiple matches are triggered from multiple FSA blocks of PRISM and then the output may optionally be used to find appropriate action associated with the matched regular expression rule. The PRISM FSA rule block output may optionally comprise of Tag Match signal(s) that may be used by the priority encoders and evaluation processors to detect partial regular expression matches. The number of tag match signals per PRISM FSA rule block may depend on the number of sub-expressions that are allowed to be detected in a given FSA. The FSA rule block is organized as a series of memory locations that each hold a portion of the FSA rule evaluation information using memory circuits like the SDV memory, Symbols memory, Mask vectors memory, initialization or start state vector memory, accept state vector memory, optionally tag state flags or vector memory, the FSA states memory or current state vector memory and the like. The FSA rule block comprises of FSA evaluation circuits interspersed amongst the memory blocks storing the FSA programmable information like the SDV, start state, accept state, symbols and the like. The FSA rule blocks evaluate multiple symbols against input stream for matches to step the FSA. Each symbol evaluation block, like 119, may optionally output an indication of a pattern comparison between the input character and the programmed symbol. These output signals, like 114, 115, 116, can be treated as local content addressable memory match signals. The PRISM memory may optionally support logic that enables generating merged CAM match signals from multiple FSA rule blocks organized in PRISM memory clusters, which may in turn be laid out in rows and columns of PRISM FSA rule blocks, to support larger width pattern matches. Thus the PRISM memory can be used as content addressable memory when enabled to process the CAM match signals. The PRISM memory can be optionally configured such that portions of the memory support CAM functionality while other portions may support FSA functionality or the entire PRISM memory may optionally be configured to behave like FSA memory or CAM memory. The CAM memories typically support functionality to detect 4 byte patterns, 18 byte patterns or even larger patterns. PRISM memory may optionally provide configuration mechanisms to support similar large pattern evaluation by chaining multiple FSA rule blocks' CAM match signals using appropriate logic to generate composite CAM match signals for desired pattern width.

PRISM memory may comprise of left-biased NFAs, right-biased NFAs or left-biased FSA or right-biased FSA or a combination of them or may be comprised as selectable left-biased or right-biased NFAs. PRISM FSA rule block memory elements like the symbol memory or the mask vector memory or the FSA state memory or the like as described above may be realized optionally using a typical six transistor configuration for one memory bit and these single memory bits are coupled together in groups of certain width like 8-bits or 16-bits or the like to occupy one memory location or address. All variations of the above are within the scope of this invention, as may be appreciated by one with ordinary skill in the art.

FIG. 2 illustrates a symbol with optional mask bit in PRISM. This figure illustrates the BL(bit line), CL (content bit line) and ML (mask bit lines) sharing the same signal, line 202, however they may each be separate, in which case the connectivity will be different to the appropriate elements of the symbol and the optional mask bit described below as may be appreciated by those with ordinary skill in the art. As described above, PRISM compiler or driver may program PRISM memory in phases. Once all appropriate FSA rule blocks have been programmed, the content search is typically initiated. Hence, a shared signal for symbol bits, mask bits and content bits is usable. However, as discussed above multiple memory ports with independent bit lines, mask lines or content lines or a combination is feasible and covered by the teachings of this patent. PRISM FSA rule is comprised of multiple symbols, where each symbol may be comprised of multiple bits, like the one illustrated in FIG. 2. The symbol bit illustrates a realization using static memory architecture for the memory bits. The transistors, 210, 225, 226, 227, 228, and 229 form a typical six transistor static memory cell which are coupled to the bit line, 202, using the line 206, and the complement of the bit line, 205, by the line 224. The transistors, 225 and 227, may optionally comprise of p-channel metal oxide semiconductor (PMOS) field effect transistor (FET) device in a complementary metal-oxide semiconductor (CMOS) process technology, while the transistors, 210, 226, 228, 229, may optionally comprise of the n-channel metal oxide semiconductor (NMOS) field effect transistor (FET) devices. These six transistors coupled together as illustrated in the FIG. 8A form a static memory cell. Memory cells comprised of other transistor devices in other process technologies like SiGe, Bipolar or the like providing similar functionality as those in this patent are all within the scope and spirit of the teachings of this patent as may be appreciated by those with ordinary skill in the art. The transistors 225, 226, 227 and 228 are setup as back to back inverters which are written to from the BL, 202, and BLn, 205, coupled to transistors 210 and 229 respectively, when the word line WL, 201 is selected which activates the devices 210 and 229 and when the BL and BLn are driven by bit line drivers, not illustrated, with the logic value and its complement to be stored in the memory cell. This memory cell stores a symbol bit. If a logic value '1' needs to be stored, the BL is driven by '1' and BLn by '0'. If the WL is active then the logic value gets stored in the symbol memory bit. When the symbol memory bit needs to be read the BL and BLn may not be driven actively other than pre-charging. The sense amplifiers, not illustrated, attached to the bit lines, BL and BLn, may then detect the differential in the voltage swing on BL and BLn to read the symbol memory bit value. Multiple symbol bits like the one illustrated in FIG. 2 together form a symbol for a state. The symbols may comprise of n-bits, where n is any non-zero positive integer. In one embodiment the number of symbol bits per symbol may be 8, while in another embodiment there may be 16 bits per symbol. The transistors, 212, 214, 215, 216, 217 and 218 form a typical six transistor memory cell as above, where the transistors 214 and 216 may optionally be of PMOS type, while the others may optionally be of NMOS type, which is accessed by selecting mask word line, MWL, signal 203. This memory location is used to store an optional symbol mask bit. The number of mask bits in a mask may optionally be the same as the number of symbol bits in a symbol. The symbol mask bit when set enables the symbol evaluation and disables the evaluation when the mask bit is disabled. Reverse setup is also feasible, except the connectivity between the symbol memory cell and the mask memory cell would need to be changed appropriately as can be appreciated by those with ordinary skill in the art. The device pairs 208, 209 and 221, 222 are coupled to the symbol bit, mask bit, and content line (CL) and form an XOR functionality by coupling with the RSx/CAM Match x pre-charged signal 204. This signal 204, is shared between adjoining symbol bit blocks of a PRISM FSA rule block. This signal is pulled low, if any of the bit pairs of the content presented during content evaluation on the bit lines and the symbol stored in the symbol memory do not match, when the appropriate mask bit is set. The signal stays high only if all the bits of the symbol match all content bits. The mask bit is coupled to devices 208 and 209 by the signal 213. When the mask bit is set, device 215, is turned-on which enables the path from devices 208 and 209, when the content value on CL, 202, coupled to device 209, is '1' and when the symbol bit value, signal 223, is '0', a value of '1' is coupled to 208 by signal 211 which enables the path from the RSx/CAM Match x, signal 204, to ground, GND. This causes the match signal 204 to be pulled-down or low indicating a mismatch. Similarly the transistors 221 and 222, provide the complement function as the devices 209 and 208, forming a XOR function on the RSx/CAM Match x signal, signal 204. Thus, the match signal, 204, stays high or active only when all the bits of the symbol and the content input match respectively. The mask bit vector associated with a symbol may be used to provide complex symbols for PRISM. For example, there may be a regular expression to search a pattern of string like 'abc' by ignoring the case of the alphabets so that any content like 'aBc' or 'Abc' or 'ABC' or the like that is found in the content being evaluated matches the programmed rule 'abc' in PRISM. For such a regular expression mask bits associated with a symbol of interest may be used. The ASCII representation of lower case alphabets and the upper case alphabets differ only in one bit, e.g 0x41 and 0x61 represent lower case and upper case versions of alphabet A. By masking the $7^{th}$ bit of an input character, one can detect an alphabet irrespective of its case. Hence for the rule to ignore the case for a string 'abc', one can set the seventh mask bit for each of the symbols to active low state and thus cause the seventh bit to be ignored from comparison with the input symbol there by creating an ignore case for the regular expression and enable a case-insensitive complex symbol in PRISM. Though the symbol evaluation illustrated is a compare operation, other operations like range detect, illustrated below or other ALU operations may be implemented with appropriate circuits added without digressing from the teachings of this application as may be appreciated by those with ordinary skill in the art.

FIG. 3 illustrates range detection bit in PRISM. As discussed above, there are complex regular expressions that may use a range to indicate a range of symbols, for example range [a-z] is used to indicate any lower case alphabet. A complex symbol evaluation circuit that can implement an entire range in PRISM is advantageous because without such a facility, a rule with a range above would need to be expanded to cover 26 symbols with alternation between them. Thus many valuable PRISM resources would get used up for a single complex symbol. However, it is not obvious how such a capability may be provided in PRISM. The FIG. 3 illustrates a single bit of a range detect circuit in PRISM, which coupled with similar circuits for all bits of the complex range symbol and coupled to the Range Detect circuit for FSA rule block in PRISM illustrated in FIG. 4 forms a complex symbol for range detect and its evaluation circuit. A symbol range is typically comprised of a minimum value, a maximum value or a combination. Hence, to detect a content symbol to be within the range, one can try to evaluate if the symbol is lower than the minimum or higher than the maximum or a combination and if both conditions are false, they indicate the symbol to be within the range defined by the minimum and the maximum values of the range. It is also possible to detect if a symbol is in range is to see if the symbol is less than or equal to the maximum value and greater than equal to the minimum value. All such ways of detecting if a symbol is within range are covered by the teachings of this patent. For example, if the range is denoted by Min and Max, then the input symbol (Cin) is within the range if Cin is not less than Min and Cin is not greater than Max otherwise Cin is not within range. The circuit in FIG. 3 illustrates the range detection using the principle outlined above. A range symbol comprises a minimum value, Min, and a maximum value; Max, which are defined by the regular expression rule. Min and Max values each are stored as n-bit value in PRISM memory, where 'n' is the number of bits of each symbol being evaluated. The figure does not illustrate a mask vector for each of the range value but it may optionally be present. Compared to the simple symbol with an optional mask, comprised of multiple symbol bits and mask bits like those illustrated in FIG. 2, the range symbol may also comprise of multiple symbol bits and optional mask bits, where a range symbol may optionally use two memory locations, one for the Min value and one for the Max Value. A six transistor memory cell, block 311, comprised of transistors, 310, 325, 326, 327, 328 and 329 form a typical static RAM memory cell that is used to store a bit of the Min value. Similarly, block 313 comprised of transistors, 312, 314, 315, 316, 317, and 318 form another typical static RAM cell that is used to store a bit of the Max value. Multiple such bits coupled together in PRISM FSA rule block may be used to represent the Min and Max values of a range expression and form a complex symbol memory representing a range symbol. To evaluate whether an input symbol X is within the range with A being the Min Value and B being the Max value of the range, two operations may be performed, one to evaluate if X is less than A or not and second to evaluate if X is greater than B or not. The results of these evaluations may then be used to evaluate if X is within the range or outside the range. Assuming an n-bit length of each of these values, X<A can be evaluated by evaluating each corresponding bit pairs of X and A from the most significant bit to the least significant bit. For example if n=3, X<A may be evaluated by using the following logical equations: If $X=X_3X_2X_1X_0$; $A=A_3A_2A_1A_0$; $E_3$ NOT $((X_3$ AND (NOT $A_3))$ OR $((NOT X_3)$ AND $A_3))$; $E_2$=NOT $((X_2$ AND (NOT $A_2))$ OR $((NOT X_2)$ AND $A_2))$; $E_1$=NOT $((X_1$ AND (NOT $A_1$p OR $((NOT X_1)$ AND $A_1))$; $E_0$=NOT $((X_0$ AND (NOT $A_0))$ OR $((NOT X_0)$ AND $A_0))$; $L_3$=(NOT $X_3)$ AND $A_3$, $L_2$=((NOT $X_2)$ AND $A_2)$; $L_1$=(NOT $X_1)$ AND $A_1$; $L_0$=(NOT $X_0)$ AND $A_0$; then $L=L_3$ OR $(E_3$ AND $L_2)$ OR $(E_3$ AND $E_2$AND $L_1)$ OR $(E_3$ AND $E_2$ AND $E_1$ AND $L_0)$ denotes X<A. Similarly, X>B for n=3 may be evaluated as: If $X=X_3X_2X_1X_0$; $B=B_3B_2B_1B_0$, $E_3$=NOT $((X_3$ AND (NOT $B_3))$ OR $((NOT X_3)$ AND $B_3))$; $E_2$=NOT $((X_2$ AND (NOT $B_2))$ OR $((NOT X_2)$ AND $B_2))$; $E_1$=NOT $((X_1$ AND (NOT $B_1))$ OR $((NOT X_1)$ AND $B_1))$; $E_0$=NOT $((X_0$ AND (NOT $B_0))$ OR $((NOT X_0)$ AND $B_0))$; $G_3$=(NOT $B_3)$ AND $X_3$; $G_2$=((NOT $B_2)$ AND $X_2)$; $G_1$=(NOT $B_1)$ AND $X_1$; $G_0$=(NOT $B_0)$ AND $X_0$; then G=$G_3$ OR $(E_3$ AND $G_2)$ OR $(E_3$ AND $E_2$AND $G_1)$ OR $(E_3$ AND $E_2$ AND $E_1$ AND $G_0)$ denotes X>B. Thus the symbol X is within range A and B, if (NOT G) AND (NOT L) is true, i.e. when X is not Greater than B and X is not Less than A. Though the above examples use n=3 for ease of explanation, the value of n can be any integer. Each range detect bit like that illustrated in FIG. 3, evaluates a component (NOT G), signal 331 and a component (NOT L), signal 304. Transistors, 308, 309 and 332, form the component (Em AND Gm) where Em is the combined equality signal from the higher order bit pairs of X and B when each pair is equal and m is the current bit placement of the range. The (NOT G), signal 331, labeled Not_GreaterThanMax in FIG. 3 is a pre-charged signal to which each bit's (Em AND Gm) signal is coupled to When X>B, the signal Not_GreaterThanMax, signal 331, is pulled down by at least one of the range detection bits, indicating that X is greater than. B. When X is not greater than B, the signal Not_GreaterThanMax, signal 331, stays pre-charged, indicating that X is not greater than B (Max value of the range). Transistors, 308 and 309, couple (NOT b) and x, where b is a bit of the Max value (B) and x is a corresponding bit of the received symbol X, to signal M×NEQ_in, signal 333a, indicating whether the higher order bits of this bit location, are equal or not. M×NEQ_in is active low when the higher order bits have their corresponding X and B bit-pairs equal to each other. This means that when the upper bits are equal and hence the determination of whether X is greater than B is determined by the evaluation of the current bit location, or lower order bits or a combination. If x=1 and b=0, and M×NEQ_in =0, then the transistors 308, 309 and 332 are each active and provide a path from the signal Not_GreaterThanMax, signal 331, to GND and thus pull down this precharged signal to an active low value indicating that X is greater than Max value B and hence not within the range. Similarly, the transistors, 321, 322 and 334, form the component (Em AND Lm) where Em is the combined equality signal from higher order bit pairs of X and A when each pair is equal. The (NOT L), signal 304, labeled Not_LessThanMin in FIG. 3 is a pre-charged signal to which each bit's (Em AND Lm) signal is coupled to. When X<A, the signal Not_LessThanMin, signal 304, is pulled down by at least one of the range detection bits, indicating that X is less than A. When X is not less than A, the signal Not_LessThanMin, signal 304, stays pre-charged, indicating that X is not less than A (Min value of the range). The signals Not_LessThanMin and Not_GreatThanMax are shared among all the bits of the range symbol and can be pulled active low by any one of them when at any location it is determined that the value of X is either greater than B, or less than A. However, if the received symbol X is within the range A through B (including A and B), then both signals stay at precharged level. These two signals from each range symbol bit of an FSA rule block are coupled together as illustrated In FIG. 4, illustrated below, to form the indication of the received symbol to be within the defined range.

The signal M×NEQ_out and MnNEQ_out are also generated per bit pair and are respectively coupled to the M×NEQ_in and MnNEQ_in of the next lower order bit of a range symbol of a PRISM rule block. For the most significant bit of the range detect circuits, the M×NEQ_in and MnNEQ_in are driven to their active low state, so that the evaluation progresses from the most significant bit as if the higher order bits if present were equal. The signal M×NEQ_out is low when the bit pair of X and B are equal and all the higher order bits of X and B are also equal. The signal MnNEQ_out is low when the bit pair of X and A are equal and all the higher order bits of X and A are also equal. The group of transistors, 345, 346, 347, 348, form an exclusive NOR function, such that if the bit pair at the current location of X and A are both the same and the upper bits were also equal, indicated by MnNEQ_in being low coupled to transistor 344, the signal MnNEQ_out is pulled low. However, if the value of bit-pair of X and A are not equal or the higher order bits are not equal, the signal MnNEQ_out which is a precharged signal, stays at the precharged level which may be active high, indicating that the bit pairs are not equal. Similarly the group of transistors, 339, 340, 341, 342, form an exclusive NOR function, such that if the bit pair at current location of X and B are both the same and their upper bits are also equal, indicated by M×NEQ_in being low coupled to transistor 343, then M×NEQ_out is pulled low. However, if the value of bit-pair of X and B are not equal or the higher order bits are not equal, the signal M×NEQ_out, a precharged signal, stays at the precharged level which may be active high, indicating that the bit pairs are not equal. The transistors, 325, 327, 353, 344, 352, 314, 316, 343, 332, 334 illustrated in FIG. 3 may optionally be of the PMOS type, while the other transistors illustrated in FIG. 3 may optionally be of NMOS type.

Circuits illustrated in this patent may optionally operate in multiple phases. Though several circuits are illustrated as pre-charged circuits in this patent, one with ordinary skill in the art will appreciate that circuits comprising teachings of this patent can be implemented without using pre-charge circuits and such circuits are within the scope of the teachings of this patent. When precharge circuits are used, such circuits may use a precharge device, like 353, which is activated during the precharge phase of a clock signal, not illustrated, that keeps various circuits of this patent operating together, where the precharge device is activated by a precharge signal, like 354, and pre-charges the signal coupled to one end of the precharge transistor, like 353, to an active high level and precondition the signal to an active high level. Then during an evaluate phase of the clock signal, the transistors connected to the precharged signal like 351, may be activated and pull the precharged signal to an active low level or may leave the signal at the precharged level. It may also be feasible to devise circuits that precondition a signal to an active low level as well. Design of precharge and discharge circuits, and clocks is well understood by people with ordinary skill in the art and hence is not further elaborated upon to not obscure the invention.

The structure of the block 311 and 313 are similar to the symbol bit and the mask bit illustrated in the FIG. 2. Thus a range detect bit in PRISM may be created in an area similar to and with less than twice the number of devices as a symbol bit with mask bit illustrated in FIG. 2 and occupying no more PRISM memory space.

FIG. 4 illustrates range detect for an FSA state in PRISM. The Not_LessThanMin and Not_GreaterThanMax signals from the range detection bits like that illustrated in FIG. 3 that comprise the n-bit complex range symbol are coupled together to form (Not_LessThanMin AND Not_GreaterThanMax) to detect the received symbol to be with in the range. The devices 401 and 402, are the precharge devices that precharge the Not_LessThanMin, signal 304, and Not_GreaterThanMax, signal 331, signals when Prech# signal line 411 is asserted to a low value. The signals 304 and 321 are coupled to the transistors 403, 404, 405, and 406, to form a NAND logic between these signals. The output, signal 410, of this NAND logic is inverted by the transistors 407 and 408 to generate the signal RSx/WR, signal 409. The signal RSx/WR when asserted high indicates that the received symbol on the input content on signals of this FSA Rule block is within range programmed in the range symbol memory with values of Min and Max or A and B respectively in the discussion above. The signal RSx/WR_N, signal 410, is the complement of this signal and may optionally be used by the complement logic described below. This signal RSx/WR is used by the rest of the FSA rule block circuits in a manner similar to the RSx/CAM Match signal, 204, or signal 121 to process the incoming content and evaluate the FSA of the regular expression with a range symbol. The transistors, 401, 402, 403, 406, 407 illustrated in FIG. 4 may optionally be of the PMOS type, while the other transistors illustrated in FIG. 4 may optionally be of NMOS type.

Incidentally, several access control list policies in networking applications for security define a range of IP addresses or ports or the like or a combination thereof to determine how network packets from such addresses or ports or the like may be handled. The range evaluation circuits illustrated above may also be used for detecting ranges of IP addresses or IP address classes or IP ports or the like and be used as a range matching solution for such applications as well.

FIG. 5 illustrates complement logic for an FSA state in PRISM. As discussed above, it is advantageous to represent complemented logic for a state symbol to compactly represent certain Regular Expression rules for example a rule like [^a-z] which indicates to look for symbols that are not the lower case alphabets a through z. Such a rule may be implemented in as an alternation of all symbols except lower case alphabets. However, such a method may use up to 230 symbols (assuming each symbol is 8 bits wide), and waste valuable resources of PRISM FSA rule blocks. Hence it is not only advantageous to represent such regular expression symbols or operations directly in a PRISM FSA but also important to save precious state resources of a PRISM integrated circuit (IC) chip. FIG. 5 illustrates such complement logic circuit for an FSA rule block of PRISM. PRISM FSAs that provide facility to program complement symbols, may optionally provide a complement control bit, 525, which may control whether a detected symbol should be used in a complement form or a non-complemented form. There is optionally at least one complement control bit per symbol. Thus if there are n-states in an FSA, where each state can represent a complemented symbol, then an n-bit complement control vector may be used and occupy one memory location in the PRISM memory space. However, it is feasible to have each complement control bit separate as well. The transistors, 506, 512, 513, 514, 515 and 518, form a typical static memory bit, which may be programmed with the complement control value. When the complement control bit is set to high, the RSx/WRx signal, 502, is complemented and presented to the output RSx/WRx_C, signal 511, where as when the complement control bit is set to low, the RSx/WRx_N signal, signal 503, is complemented and presented at RSx/WRx_C, signal 511, which effectively couples the logical value of RSx/WRx on signal 511. The transistors, 509 and 510, couple the complement control bit value on signal 507 with the RSx/WRx signal on signal 502, on to the signal 511, where as the transistors, 519 and 521, couple the complement of complement control bit value on signal 523, with the RSx/WRx_N signal on signal 503, on to the signal line 511. As illustrated the signal 511, RSx/WRx_C is a precharged signal though it can be implemented with a non precharged version of such circuit as well as. The transistors, 512, 514, 508 illustrated in FIG. 5 may optionally be of the PMOS type, while the other transistors illustrated in FIG. 5 may optionally be of NMOS type.

FIG. 6 illustrates Partial State Bit in PRISM. The partial state bit comprises of a memory bit for a bit of state dependent vector (SDV). The transistors 606, 612, 613, 614, 615 and 618 form a typical six transistor static memory cell configuration to store the SDV bit. The operation of this memory bit is similar to the memory bits described above. The word line WL2, 601, selects devices 606 and 618, and the BL/CL/ML, and the complement, BLn/CLn/MLn, are coupled to the memory cell from 605 and 620 respectively. The transistors 608, 609, 610, 611, 616 and 619, form the three input NAND gate between the stored SDV bit, the input state Qy, 621 and the RSx/WRx_C signal 602 coupled to transistor 611 using signal 604. The NAND gate generates the partial state transition control signal STxy, 617, that indicates if there is a transition from state 'x' to state 'y' activated. Even though the circuit of the NAND gate is fully static, it may be possible to use precharged circuits to realize the same function with fewer gates as may be appreciated by those with ordinary skill in the art. The transistors, 612, 614, 608, 616, 619, illustrated in FIG. 6 may optionally be of the PMOS type, while the other transistors illustrated in FIG. 6 may optionally be of NMOS type.

FIG. 7a illustrates state control block in PRISM. The NAND gates, 701(1) through 701(n) are bit specific state transition control logic portions that logically NAND the partial state outputs from the partial state logic bits like those illustrated in FIG. 6. The blocks 702(1) through 702(n) are the initialization blocks that store the initialization vector for the NFA of FSA and the blocks 703(1) through 703(n) hold the states of the NFA or FSA rule block.

FIG. 7b illustrates local Init Detect Circuit in PRISM. This circuit may be optionally used to detect if the states of the FSA reach an error, which in this case is assumed to be all state bits to be inactive or low. The FSA is evaluating a symbol only when at least one of the states is set, otherwise the FSA may reach an error state and stop evaluating the input content. To prevent such a condition, the circuit illustrated in FIG. 7b is used to generate a local initialization signal whenever all the states of the FSA are inactive. This signal, Init, can then be used to set the FSA to a predefined start state from the initialization vector. The signal LInit, 718, is pre-charged to an active high value. Whenever, at least one of the state bits, Q1 through Qn is active the transistor coupled to that state, 707(1) through 707(n) respectively, is turned on and the signal LInit is pulled to an active low state, however when each of the state bits is inactive, the LInit signal stays high indicating a local initialization signal which gets processed by state control block bit gates 719 and the multiplexer, 715, that then initializes the state bit, 732, to the start state memory bit coupled through signal 724 and the multiplexer 714 and 715 to the state memory bit, 732.

The FIG. 7c illustrates state control block bit in PRISM. This block bit stores the initialization vector or start state bit in a typical six transistor static memory configuration created using the transistors, 708, 710, 712, 711, 713 and 709. The start state bit is selected by the FSA controller by driving the word line ivWL, 727, which is coupled to devices 708 and 709. The value on the BL and BLn is coupled through those transistors into the memory cell during write and is read onto the bit lines during a read operation. The output of the memory cell, 724, is used as one of the inputs to a multiplexer, 714 which may optionally be present to enable selection of the initialization vector bit. When the Load signal, 717, is asserted, the value of signal LSn, 716, is coupled to the output of the multiplexer, 722 but when Load signal is not asserted the start state bit, 724, is coupled to 722. The signal LSn, may optionally be provided as a means to load a state context that was saved earlier or any other state value to be loaded into the state bit, 732. The state bit, may alternatively be written using a memory bit and be coupled with the other initialization logic appropriately. The Load signal may be asserted by the FSA controller to indicate updating the state bit value. During normal operation the signal 725 that acts as a select signal for the multiplexer 715 is inactive, selecting the output of the bit location specific gate like 701(n) which indicates the state transition of the FSA during normal content evaluation. However, if the local initialization signal is asserted then path from the start state bit 724, to the state bit, 732 is enabled and the state bit gets initialized. There may also be a need to provide a global cluster wide or PRISM memory wide initialization, which is controlled by asserting global initialization signal GInit, 718b which again enables the path from the start state bit 724 to the state bit 732. The state control block may generate state bit signals Qn, 729 and optionally signal Qnb, 730. The state bit, 732, may be updated at synchronized interval with other parts of the memory, using a control signal, 731, which may be a clock or an enable signal or other signal like hold or a combination.

FIG. 8 illustrates Tagged match detect block bit in PRISM. An FSA in PRISM may optionally be tagged: The discussion below is with respect to tagged NFA or FSA, though it is also applicable for non-tagged NFAs or FSAs where the tagging elements, are not used or not present. The tagged match detect block bit comprises of accept state memory bit, formed by the familiar six transistor static memory bit, where the transistors 806, 810, 812, 811, 813 and 814 form accept state memory bit. The devices 806 and 814 are coupled to the word line AWL, 801, which selects the accept memory bit when it needs to be read or written. These devices are also coupled to the four transistors forming the back to back inverter and the bit lines, 804 and 815. This memory bit is read and written in a manner similar to the description for other memory bits above. The tagged Match Detect block bit may optionally comprise of a tag state memory bit which may be set to detect a sub-expression evaluation. Additional tag state bits and state transition tag bits may be optionally present in PRISM tagged match detect block bit but are not illustrated in this figure. The optional tag memory bit is again stored in a typical six transistor memory cell comprising the transistors, 824, 825, 826, 827, 828 and 829. This memory location may be selected by asserting word line TWL, 819. The operation of the tag memory cell is similar to other memory cells described above. The rule match detection is formed by coupling accept state bit 807 and the FSA state Qn, 802, through the devices 808 and 809. When accept state bit is set, it indicates that the particular state bit is an accept state, meaning that when the FSA evaluation reaches that state a string recognized by the regular expression rule programmed in the NFA is found and hence a rule match should be signaled. The Rule Match signal, 803, is an active low signal as illustrated. It is precharged to a high value as long as a state which is an accept state is not reached. However, when Qn signal is asserted and the accept state bit 807, corresponding to that state signal Qn, is set, the devices 808 and 809 pull the rule match signal low, indicating a match. The rule match signal is shared with the adjoining bits of the FSA, so when any accept state bit is matched the Rule Match signal is asserted to an active low value. The polarity of the rule match signal can be reversed by selecting appropriate bits to couple to the transistors 809 and 808. Similarly, if the tagging is supported, the devices 830 and 832, couple to the tag match signal, 822 and pull it down if the tag is asserted and the FSA state is also asserted. The rule match and tag match signals from individual FSA rule blocks in a PRISM cluster array may be evaluated by a local and/or global priority encoder and the evaluation processors, not illustrated, of PRISM memory and appropriate actions taken.

FIG. 9 illustrates A Regular Expression and Complex Symbols.

FIG. 10 illustrates a Programmable Intelligent Search Memory (PRISM) Block Diagram. As may be appreciated by one skilled in the art, many different variations of these blocks and their configuration, organization and the like can be created from the teachings of this disclosure and are all covered without limitation. PRISM controller, block 1003, communicates with a rules distribution engine to receive appropriate compiled rule tables prior to starting the content inspection. It programs the received rules into an appropriate NFA rule memory by working with the address decoder and control logic block 1004, coupled to the PRISM controller, block 1003, and the PRISM memory cluster arrays, block 1010. There may be multiple rules stored in each PRISM memory cluster array NFA search blocks. There may optionally be multiple application specific contexts, not illustrated, supported by the PRISM memory cluster arrays. Once the rules distribution engine provides the compiled rules to the control processor and scheduler and they are setup in their respective NFA rule blocks, PRISM memory is ready to start processing the data stream to perform content inspection. The PRISM memory state configuration information is received via the external interface, block 1002, which may communicate on a system bus or a network or the like with a companion processor. The PRISM memory of this patent may be deployed in various configurations like a look-aside configuration or flow-through configuration or an accelerator adapter configuration or may be embedded inside a variety of processors or logic or ASICs or FPGA or the like as discussed earlier as well others not illustrated. In a look-aside or an accelerator adapter configuration, the PRISM memory can be under control of a master processor which may be a network processor or a switch processor or a TCP/IP processor or classification processor or forwarding processor or a host processor or any combination thereof, depending on the system in which such a card would reside. The PRISM controller, block 1003, receives the configuration information under the control of a master processor that communicates with the rules engine to receive the configuration information and pass it on to the PRISM memory. Once the configuration is done, the master processor provides packets or data files or content to the PRISM memory for which content inspection needs to be done. The external interface, block 1002, used to communicated with a master processor may be standard buses like PCI, PCI-X, PCI express, RapidIO, HyperTransport or LA-1 or DDR or RDRAM or SRAM memory interface or their derivatives or the like or a proprietary bus. The bandwidth on the bus should be sufficient to keep the content search memory operating at its peak line rate. The PRISM memory may preferably be a memory mapped or may optionally be an IO mapped device in the master processor space for it to receive the content and other configuration information in a look-aside or accelerator configuration. The PRISM optionally may be polled by the master processor or may provide a doorbell or interrupt mechanism to the master to indicate when it is done with a given packet or content or when it finds a match to the programmed rules.

The PRISM controller receives incoming data to be examined for regular expression rules or pattern matches, and may optionally store them into data buffer/memory, block 1007, before presenting it to the PRISM memory cluster arrays. The PRISM memory may optionally directly stream the content to be examined to the content stream logic, block 1008, which may stage the content in a content staging buffer, block 1009, for examination by the PRISM memory cluster arrays, block 1010. The PRISM controller maintains the record of the content being processed and once the content is processed it informs the master processor. The PRISM memory cluster arrays inform the global priority encoder and evaluation processor, block 1013, of the results of the search. When a match to a rule is found the priority encoder and evaluation processor may retrieve an action associated with the rule from the global action memory, block 1017, depending on programmable policies and may optionally provide this to the PRISM controller. The PRISM controller may optionally inform the master control processor about the search results. The PRISM controller may execute the specific action or policy defined for the rule match. The actions may optionally comprise: stopping further content evaluation, enabling a certain set of rules to be examined by enabling appropriate cluster array and passing the content through that examination, or informing the master processor of the result and continuing further examination or hold the match result in on-chip or off-chip memory or buffers for the master processor to request this information later, or any combination thereof or the like. If the PRISM memory is configured to examine network traffic in a flow-through configuration it may also be programmed to drop the offending packet or stop the specific TCP connection, or the like. Optionally, the master processor may receive the match information and may take specific actions on the content stream.

The address decode and control logic, block 1004, is coupled to the PRISM controller, 1003, the external interface, 1002, the PRISM memory cluster arrays, 1010, the global priority encoder and evaluation processor, 1013, the database expansion port, 1018, the global context memory, 1012, memory control, 1014, the Global Action Memory, 1017, the memory control 1019, the external memory controller, 1021, as well as other blocks through the coupling interface, 1015. The PRISM memory may support a large number of regular expressions in some embodiments as discussed above, however if there are applications that need more rules, then there may optionally be a database expansion port, 1018, which would enable the expansion of the rules by adding additional PRISM memory(ies) to the database expansion port. The database expansion port may provide a seamless extension of the number of rules and may use additional memory space in the host or master processor. There are multiple ways of enabling the database expansion as may be appreciated by those skilled in the art. The address decoder and control logic can also be coupled to an optional, cluster address decoder and FSA controller and can decode addresses for the PRISM memory locations which are used to hold FSA rule block programming information as well as the FSA state information. It may perform the address decoding, memory read, memory write and other PRISM memory management control functions by itself or working in conjunction with the cluster address decoder and FSA controller. The blocks 1004 and optional cluster address decoder and FSA controller, may be programmed to provide configuration information for the clusters. The configuration information may optionally comprise of size of the NFAs e.g. 8-state or 16-state or the like, CAM functionality enabling, tagged NFA related configuration, context addresses if appropriate for local cluster context addressing and/or global context addresses, cluster specific configurations that may support a mixed CAM and Regular Expression functionality at the PRISM memory level, action memory association for specific FSA rules or clusters, or a combination thereof and the like. The PRISM memory cluster arrays and other blocks like a priority encoder and evaluation processor, local and global action memories and the like get configured and programmed with information before the content inspection begins. The PRISM memory supports the ability to support multiple content streams to be processed through the arrays, using context mechanism which associate each content stream with a specific context, which may optionally be assigned a specific context ID.

The sense amplifiers and drivers may optionally be present at the global PRISM memory level, depending on the tradeoffs of die area, performance, cost, power and the like which one skilled in the art can appreciate. The benefit of having local sense amps and drivers is potentially creating lower interconnect load for individual memory bits, which in turn can help improve the performance. The PRISM controller, block 1003, working with the content stream logic, block 1008, content staging buffer, block 1009, address decode and control logic, block 1204, and the cluster FSA controllers may present the content to be examined to the PRISM NFA rule blocks. The content to be examined may be streamed by the block 1008 from the data buffer or memory, block 1007, or from external memory, or a combination into the content staging buffer, block 1009. The content staging buffer, block 1009, may hold content from the same context or multiple contexts depending on the configuration of the clusters and the like. The content is presented to the cluster PRISM array that comprises the PRISM NFA blocks for examination in a sequence timed using a control signal like a clock or enable or a combination. The NFA blocks perform their inspection and indicate whether there is any rule match or optionally if there is any CAM pattern match or optionally any tag match and the like. The match signals are looked at by a global priority encoder and evaluation processor, block 1013, which may determine if there is a match and if there are multiple matches which match should be used, or whether all matches should be used or the like depending on the configuration. The global priority encoder and evaluation processor may optionally generate address(es) for the winning match(es) to the global action memory 1017 or external memory or a combination that may store appropriate action information that needs to be retrieved and processed to determine action(s) that need to be taken as a result of specific rule match(es). There may be optional cluster level action memory, not illustrated, for fast retrieval of action information. This cluster level action memory may act as a cache of the global and/or external memory based action storage.

The PRISM memory of this invention may be manufactured into hardware products in the chosen embodiment of various possible embodiments using a manufacturing process, without limitation, broadly outlined below. The PRISM memory in its chosen embodiment may be designed and verified at various levels of chip design abstractions like RTL level, circuit/schematic/gate level, layout level etc. for functionality, timing and other design and manufacturability constraints for specific target manufacturing process technology. The PRISM memory design with other supporting circuitry of the chosen embodiment at the appropriate physical/layout level may be used to create mask sets to be used for manufacturing the chip in the target process technology. The design would be verified at various design abstraction levels before manufacturing and may be verified in a manufactured form before being shipped. The mask sets are then used to build the PRISM memory based chip through the steps used for the selected process technology. The PRISM memory based chip then may go through testing/packaging process as appropriate to assure the quality of the manufactured product.

Thus the inventions of this patent cover various aspects like:

A memory architecture comprising programmable intelligent search memory (PRISM) for content search wherein the PRISM memory provides search capability for regular expression based search with complex symbol evaluation. The PRISM memory may further be implemented as an integrated circuit chip or be embedded in other chips or systems or the like or a combination thereof.

The PRISM memory further comprises an array of search memory circuits that provide the regular expression search functions for searching content from documents, messages or packets or other data received from the network or the local host or a master processor or a network processor or TCP Offload Engine or Processor or Storage Network processor or a security processor or other processor or a combination thereof.

The PRISM memory further comprises of a plurality of clusters of the search memory circuits that provide regular expression search functions for a plurality of regular expressions. The search memory circuits comprise of memory elements to store symbols of finite state automata representing the regular expressions. The search memory circuits further comprise memory elements to store mask vectors (MV) that may be applied to the stored symbols. The mask vectors are coupled to the symbol memory elements and the content being searched through symbol evaluation circuits that detect whether the received content comprises of the symbols being searched. The search memory circuits further comprise of memory elements to store elements of state dependent vectors (SDV) which are used to decide the state traversal by the search memory for the finite state automata. The search memory circuits further comprise of match detect circuits that operate by coupling with the memory elements for symbols, MVs, SDVs, and the symbol evaluation circuits for multiple states of the FSAs to decide on the traversal of the states in the FSA based on the content being searched and the programmed symbols, SDVs, and MVs. The search memory circuits may optionally comprise of range symbols, complemented symbols, range detection circuits, compliment detection circuits, case-insensitive character searches or the like or any combination thereof. The search memory circuits may further comprise tag and match detect circuits that operate to provide tagged FSA and regular expression search, wherein the tagged FSA is used to detect sub-string or partial regular expression match beside a full regular expression match.

The memory elements of the PRISM memory comprise of static memory cells. The memory elements are each independently addressable in a random order. The PRISM memory further comprises of circuits to couple the content search memory with other logic to provide coupling with processors that can interface to the PRISM memory integrated circuits. The PRISM memory further comprises of a controller for interfacing with the processors to receive the content to be searched. The PRISM memory may further comprise of address decode logic circuits which decode the received address to select the specific static memory cells location to be read or written. The memory elements of the search memory may each be uniquely addressed to read or write appropriate values in the memory elements. The address decoding logic and the controller generate control signals necessary to address the appropriate memory locations of the static memory cells based search memory. The control signals are coupled to the PRISM arrays as a series of word lines and bit lines that can randomly be used to access desired memory locations.

The memory elements of PRISM support detection of character pattern strings. The PRISM memory comprises of symbol detection circuits and may optionally comprise of mask vectors per symbol bits, that may be used to evaluate received character string using simple XOR based compare or other logic function and create a match indication. The PRISM match signal processing circuits may logically combine multiple match signals from each symbol detection block to generate a composite match signal which would be activated only if all the symbols have a match. The composite match signal creates a match functionality like a traditional CAM chip and thus enable PRISM chip to be partially or fully configured to behave like a CAM provide a pattern matching functionality beside regular expression search.

While the foregoing has been with reference to particular embodiments of the invention, it will be appreciated by those with ordinary skill in the art that changes in these embodiments may be made without departing from the principles and spirit of the invention.

The invention claimed is:

1. The integrated circuit chip comprising programmable intelligent search memory for content search wherein said programmable intelligent search memory performs regular expression based search and wherein said regular expression comprises complex symbols, said programmable intelligent search memory for content search using one or more regular expressions, said one or more regular expressions comprising one or more symbols or characters and further comprising one or more complex symbols, said one or more regular expressions converted into one or more finite state automata representing the functionality of said one or more regular expressions for programming in said programmable intelligent search memory, said one or more finite state automata comprising a plurality of states, said plurality of states derived from said one or more symbols or characters of said one or more regular expressions, said content comprising one or more input symbols provided as input to said programmable intelligent search memory, said programmable intelligent search memory comprising at least one of each of:

a. a symbol memory circuit to store said one or more symbols;

b. a complex symbol memory circuit to store said one or more complex symbols;

c. a complex symbol evaluation circuit coupled to said complex symbol memory circuit to evaluate match of said one or more complex symbols stored in said complex symbol memory circuit with said one or more input symbols of said content;

d. a symbol evaluation circuit coupled to said symbol memory circuit to evaluate match of said one or more symbols stored in said symbol memory circuit with said one or more input symbols of said content;

e. a state dependent vector memory circuit to store state transition controls for said one or more finite state automata;

f. a current state vector memory circuit to store said plurality of states; and g. a state transition circuit coupled to said symbol evaluation circuit, said complex symbol evaluation circuit, said current state vector memory circuit and said state dependent vector memory circuit to perform state transition from one or more first states to one or more second states of said plurality of states of said one or more finite state automata.

2. The integrated circuit chip of claim 1, wherein the symbol memory circuit, the complex symbol memory circuit, the state dependent vector memory circuit, and the current state vector memory circuit of the programmable intelligent search memory comprises static random access memory circuits.

3. The integrated circuit chip of claim 1, wherein the programmable intelligent search memory further comprises at least one of:

a. a memory circuit to store mask vector coupled to said one or more symbols to enable or disable evaluation of specific bits of said one or more symbols by said symbol evaluation circuit;

b. received symbol vector signals generated by said symbol evaluation circuit to indicate when said content comprises said one or more symbols of said one or more finite state automata;

c. an accept state vector memory circuit to store which of said one or more states are accept states, said accept states used to detect when said one or more regular expressions have matched with said content;

d. a tag state vector memory circuit to store which of said one or more states are tag states, said tag states used to detect when said one or more regular expressions have partially matched with said content;

e. a start state vector memory circuit to store initialization values of said one or more states;

f. a regular expression match detect circuit to detect a match in said content with said one or more regular expressions;

g. a tag match detect circuit to detect a tag match in said content for said one or more finite state automata that are tagged to detect a partial regular expression match or to detect a sub-string match or a combination thereof; or h. any combination of a through g above.

4. The integrated circuit chip of claim 3, wherein the programmable intelligent search memory comprises memory circuits that are each independently addressable in a random order.

5. The integrated circuit chip of claim 1, wherein the programmable intelligent search memory further comprises circuits to couple said programmable intelligent search memory to at least one functional block or circuit or a combination.

6. The integrated circuit chip of claim 5, wherein the at least one functional block comprises a microprocessor, multi-core processor, network processor, graphics processor, switch processor, microcontroller, TCP Offload Engine, network packet classification engine, protocol processor, regular expression processor, security processor, content search processor, network attached storage processor, storage area network processor, wireless processor, mainframe computer, grid computer, server, workstation, personal computer, laptop, handheld device, cellular phone, wired or wireless networked device, switch, router, gateway, chipset, unified threat management device, and the like or any derivatives thereof or any combination thereof.

7. The integrated circuit chip of claim 1, wherein the symbol evaluation circuit comprises one or more symbol match signals to indicate a match of said one or more stored symbols with said one or more input symbols of said content.

8. The integrated circuit chip of claim 7, wherein the plurality of one or more symbol match signals coupled together to form a composite match signal.

9. The integrated circuit chip of claim 8, wherein the composite match signal indicates a composite match, said composite match signal asserted only when each of said one or more symbol match signals coupled to form said composite match signal have a match with a plurality of said one or more input symbols of said content.

10. The integrated circuit chip of claim 1, wherein the one or more finite state automata comprises non deterministic finite state automata or tagged non deterministic finite state automata or deterministic finite state automata or a combination thereof.

11. The integrated circuit chip of claim 5, wherein the one or more finite state automata of claim 5, comprising comprises programmable finite state automata comprising said one or more states wherein each state of said one or more states is coupled to at least one said state dependent vector memory circuit to control and program which of said one or more states are coupled to said each state.

12. The integrated circuit chip of claim 1, wherein the one or more finite state automata comprises said one or more states wherein each state of said one or more states is entered from a set of said one or more states coupled to said each state using the same symbol of said content being searched.

13. The integrated circuit chip of claim 1, wherein the one or more finite state automata comprises said one or more states wherein each state of said one or more states is exited to a set of said one or more states coupled to said each state using the same symbol of said content being searched.

14. The integrated circuit chip of claim 1, wherein the one or more finite state automata comprises said one or more states wherein a set of said one or more states are programmed as accept states, said accept states for use to detect when said one or more regular expressions have matched with said content.

15. The integrated circuit chip of claim 1, wherein the one or more finite state automata comprises said one or more states wherein a set of said one or more states are programmed as tag states, said tag states for use to detect when said one or more regular expressions have partially matched with said content.

16. The integrated circuit chip of claim 1, wherein the complex symbols comprises a range detect symbol or a complement symbol or a symbol with some bits masked or a combination of the foregoing.

* * * * *